United States Patent
Huang et al.

(10) Patent No.: US 11,877,290 B2
(45) Date of Patent: *Jan. 16, 2024

(54) PARALLEL UPLINK CONTROL CHANNELS IN UPLINK CARRIER AGGREGATION

(71) Applicant: QUALCOMM Incorporated, San Diego, CA (US)

(72) Inventors: Yi Huang, San Diego, CA (US); Wanshi Chen, San Diego, CA (US); Peter Gaal, San Diego, CA (US); Hwan Joon Kwon, San Diego, CA (US); Krishna Kiran Mukkavilli, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

This patent is subject to a terminal disclaimer.

(21) Appl. No.: 17/552,405

(22) Filed: Dec. 16, 2021

(65) Prior Publication Data

US 2022/0110111 A1 Apr. 7, 2022

Related U.S. Application Data

(63) Continuation-in-part of application No. 16/841,557, filed on Apr. 6, 2020, now Pat. No. 11,368,944.

(51) Int. Cl.
*H04W 72/21* (2023.01)
*H04W 88/06* (2009.01)
*H04W 72/23* (2023.01)

(52) U.S. Cl.
CPC .......... *H04W 72/21* (2023.01); *H04W 72/23* (2023.01); *H04W 88/06* (2013.01)

(58) Field of Classification Search
None
See application file for complete search history.

(56) References Cited

U.S. PATENT DOCUMENTS

| 2010/0118723 A1 | 5/2010 | Pani et al. |
| 2012/0250625 A1 | 10/2012 | Kim et al. |

(Continued)

FOREIGN PATENT DOCUMENTS

| CN | 105323849 A | 2/2016 |
| CN | 108183778 A | 6/2018 |
| CN | 109167654 A | 1/2019 |

OTHER PUBLICATIONS

International Search Report and Written Opinion—PCT/US2021/025232—ISA/EPO—dated Jun. 23, 2021.

(Continued)

*Primary Examiner* — Kodzovi Acolatse
(74) *Attorney, Agent, or Firm* — QUALCOMM Incorporated

(57) ABSTRACT

Methods, systems, and devices for wireless communications are described. A user equipment (UE) may receive a downlink transmission via at least one of a primary cell, a secondary cell, or a combination thereof. The UE may identify a feedback indication for the downlink transmission. The UE may transmit a first feedback message that includes the feedback indication via the primary cell. The UE may transmit a second feedback message that also includes the feedback indication via the secondary cell.

28 Claims, 20 Drawing Sheets

(56) References Cited

U.S. PATENT DOCUMENTS

| | | | | |
|---|---|---|---|---|
| 2013/0039231 A1* | 2/2013 | Wang | .................... | H04W 72/56 370/280 |
| 2014/0092865 A1* | 4/2014 | Heo | ...................... | H04L 5/0055 370/331 |
| 2014/0119246 A1* | 5/2014 | Yin | ....................... | H04W 72/04 370/280 |
| 2014/0119284 A1* | 5/2014 | Baldemair | .............. | H04L 5/003 370/328 |
| 2014/0161060 A1* | 6/2014 | Nam | .................... | H04L 1/1692 370/329 |
| 2014/0286276 A1* | 9/2014 | Lunttila | .................. | H04L 1/003 370/329 |
| 2015/0023228 A1* | 1/2015 | Yin | ....................... | H04L 5/0055 370/280 |
| 2015/0085719 A1* | 3/2015 | Yin | ........................ | H04L 5/001 370/280 |
| 2016/0192388 A1* | 6/2016 | Ekpenyong | ........... | H04L 1/1829 370/329 |
| 2017/0048026 A1 | 2/2017 | Park et al. | | |
| 2017/0338912 A1 | 11/2017 | Nigam et al. | | |
| 2018/0027549 A1* | 1/2018 | Wang | .................... | H04L 5/0044 370/329 |
| 2018/0062796 A1* | 3/2018 | Feng | ..................... | H04L 1/1812 |
| 2018/0338339 A1* | 11/2018 | Song | ..................... | H04W 76/14 |
| 2020/0015229 A1 | 1/2020 | Yang et al. | | |
| 2020/0015250 A1 | 1/2020 | Yang et al. | | |
| 2021/0144715 A1 | 5/2021 | Gotoh et al. | | |
| 2021/0314937 A1 | 10/2021 | Huang et al. | | |

OTHER PUBLICATIONS

International Search Report and Written Opinion—PCT/US2022/081208—ISA/EPO—dated Apr. 24, 2023.

Mediatek Inc: "Remaining Issues in Carrier Aggregation", 3GPP Draft; R1-1806776 Remaining Issues in Carrier Aggregation, 3rd Generation Partnership Project (3GPP), Mobile Competence Centre; 650, Route Des Lucioles; F-06921 Sophia-Antipolis Cedex; France, vol. RAN WG1, No. Busan, Korea; May 21, 2018-May 25, 2018 May 20, 2018, XP051441978, 12 pages.

* cited by examiner

PARALLEL UPLINK CONTROL CHANNELS IN UPLINK CARRIER AGGREGATION

CROSS REFERENCE

The present application for patent is a Continuation-In-Part of U.S. patent application Ser. No. 16/841,557 by HUANG et al., entitled "PARALLEL DUPLICATED UPLINK CONTROL CHANNELS IN UPLINK CARRIER AGGREGATION" filed Apr. 6, 2020, assigned to the assignee hereof, and expressly incorporated by reference herein.

FIELD OF TECHNOLOGY

The following relates generally to wireless communications and more specifically to parallel uplink control channels in uplink carrier aggregation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support parallel uplink control channels in uplink carrier aggregation. Generally, the described techniques provide for duplicate hybrid automatic-repeat/request acknowledgment (HARQ-ACK) feedback transmission in parallel on both a primary cell (PCell) and a secondary cell (SCell) in a carrier aggregation scenario. For example, a base station may transmit or otherwise convey a downlink transmission to a user equipment (UE) via the PCell and/or SCell. The UE may identify the feedback indication for the downlink transmission (e.g., acknowledgment/negative-acknowledgment (ACK/NACK) information indicative of whether the UE was able to successfully receive and decode the downlink transmission). The UE may transmit or otherwise convey a first feedback message including the feedback indication to the PCell and a second feedback message including the feedback indication to the SCell. Generally, the first feedback message to the PCell may be considered a primary feedback message transmission and the second feedback message to the SCell may be an optional/supplementary feedback message transmission. In some aspects, the second feedback message to the SCell is to be turned on/off by the network (e.g., via the base station, PCell, and/or SCell). For example, a grant scheduling the downlink transmission for the UE may carry or otherwise convey an indication that multi-cell uplink feedback message transmission has been enabled for the downlink transmission. The supplemental feedback message may be turned on/off based on various factors, such as SCell uplink traffic, UE power headroom, the downlink traffic type (e.g., ultra-reliable/low latency communications (URLLC)), and the like. Accordingly, the described techniques support parallel feedback message transmission to both the PCell and the SCell when the UE is configured for carrier aggregation communications.

Additional aspects of the present disclosure may enable the simultaneous transmission of uplink control channel messages (e.g., physical uplink control channel (PUCCH) messages) across the multiple serving cells, such as a PCell and an SCell. In particular, some aspects of the present disclosure may enable UEs to transmit PUCCH messages in parallel (e.g., simultaneously) via a PCell and an SCell, where the simultaneously-transmitted PUCCH messages include different payloads, different PUCCH formats, or both. For example, a PUCCH message on the PCell may include HARQ feedback, where a PUCCH message on the SCell may include channel state information (CSI). In other words, aspects of the present disclosure may enable transmission of PUCCH messages with different formats/payloads on a PCell and an SCell which at least partially overlap in the time domain. In such cases, PUCCH transmissions on the SCell may be optional/supplementary to PUCCH transmissions on the PCell. In some implementations, PUCCH transmission on the SCell may be turned on and off (e.g., activated, deactivated) by the network based on one or more parameters or characteristics, including traffic (e.g., uplink traffic) on the SCell, power headroom (PHR) at the UE, and the like.

A method for wireless communication at a UE is described. The method may include receiving downlink signaling via at least one of a PCell, an SCell, or a combination thereof, identifying a message configured via the downlink signaling, a feedback indication for the downlink signaling, or both, transmitting, via the PCell and based on the downlink signaling, a first uplink control channel message including a first payload, and transmitting, via the SCell and based on the downlink signaling, the first uplink control channel message, or both, a second uplink control channel message including a second payload different from the first payload, where the second uplink control channel message includes the message configured via the downlink signaling or includes the feedback indication for the downlink signaling.

An apparatus for wireless communication at a UE is described. The apparatus may include a processor, memory coupled with the processor, and instructions stored in the memory. The instructions may be executable by the processor to cause the apparatus to receive downlink signaling via at least one of a PCell, an SCell, or a combination thereof, identify a message configured via the downlink signaling, a feedback indication for the downlink signaling, or both, transmit, via the PCell and based on the downlink signaling, a first uplink control channel message including a first payload, and transmit, via the SCell and based on the downlink signaling, the first uplink control channel message, or both, a second uplink control channel message including a second payload different from the first payload, where the second uplink control channel message includes the message configured via the downlink signaling or includes the feedback indication for the downlink signaling.

Another apparatus for wireless communication at a UE is described. The apparatus may include means for receiving downlink signaling via at least one of a PCell, an SCell, or a combination thereof, means for identifying a message configured via the downlink signaling, a feedback indication for the downlink signaling, or both, means for transmitting, via the PCell and based on the downlink signaling, a first uplink control channel message including a first payload, and means for transmitting, via the SCell and based on the downlink signaling, the first uplink control channel message, or both, a second uplink control channel message including a second payload different from the first payload, where the second uplink control channel message includes the message configured via the downlink signaling or includes the feedback indication for the downlink signaling.

A non-transitory computer-readable medium storing code for wireless communication at a UE is described. The code may include instructions executable by a processor to receive downlink signaling via at least one of a PCell, an SCell, or a combination thereof, identify a message configured via the downlink signaling, a feedback indication for the downlink signaling, or both, transmit, via the PCell and based on the downlink signaling, a first uplink control channel message including a first payload, and transmit, via the SCell and based on the downlink signaling, the first uplink control channel message, or both, a second uplink control channel message including a second payload different from the first payload, where the second uplink control channel message includes the message configured via the downlink signaling or includes the feedback indication for the downlink signaling.

Some examples of the method, apparatuses, and non-transitory computer-readable medium described herein may further include operations, features, means, or instructions for transmitting the first uplink control channel message via a first set of resources and transmitting the second uplink control channel message via a second set of resources, where the first set of resources and the second set of resources at least partially overlap in a time domain.

Some examples of the method, apparatuses, and non-transitory computer-readable medium described herein may further include operations, features, means, or instructions for transmitting the first uplink control channel message on a first component carrier simultaneously with transmitting the second uplink control channel message on a second component carrier.

Some examples of the method, apparatuses, and non-transitory computer-readable medium described herein may further include operations, features, means, or instructions for receiving first control signaling indicating a first set of resources for the first uplink control channel message, where the first uplink control channel message may be transmitted within the first set of resources and receiving second control signaling different from the first control signaling, the second control signaling indicating a second set of resources for the second uplink control channel message, where the second uplink control channel message may be transmitted within the second set of resources.

In some examples of the method, apparatuses, and non-transitory computer-readable medium described herein, the first control signaling includes a first radio resource control (RRC) message, a first downlink control information (DCI) message, or both and the second control signaling includes a second RRC message, a second DCI message, or both.

Some examples of the method, apparatuses, and non-transitory computer-readable medium described herein may further include operations, features, means, or instructions for receiving an indication of an uplink control channel resource configuration associated with the PCell and the SCell, where the first uplink control channel message and the second uplink control channel message may be transmitted in accordance with the uplink control channel resource configuration.

Some examples of the method, apparatuses, and non-transitory computer-readable medium described herein may further include operations, features, means, or instructions for receiving an indication of a first uplink control channel resource configuration associated with the PCell, where the first uplink control channel message may be transmitted in accordance with the first uplink control channel resource configuration and receiving an indication of a second uplink control channel resource configuration associated with the PCell, the second uplink control channel resource configuration different from the first uplink control channel resource configuration, where the second uplink control channel message may be transmitted in accordance with the second uplink control channel resource configuration.

In some examples of the method, apparatuses, and non-transitory computer-readable medium described herein, the PCell may be associated with a PUCCH group and the method, apparatuses, and non-transitory computer-readable medium may include further operations, features, means, or instructions for receiving an indication of an activation of the PUCCH group on the SCell, where transmitting the second uplink control channel message may be based on the activation.

Some examples of the method, apparatuses, and non-transitory computer-readable medium described herein may further include operations, features, means, or instructions for identifying, based on the activation of the PUCCH group on the SCell, that the SCell includes a supplemental PUCCH cell configured for the SCell to receive and the UE to transmit supplemental uplink control channel messages, where transmitting the second uplink control channel message may be based on identifying the SCell as a supplemental PUCCH cell.

Some examples of the method, apparatuses, and non-transitory computer-readable medium described herein may further include operations, features, means, or instructions for receiving first control signaling indicating a first slot offset between reception of the downlink signaling and a respective transmission resource for transmitting the first uplink control channel message, where the first uplink control channel message may be transmitted in accordance with the first slot offset and receiving second control signaling indicating a second slot offset between reception of the downlink signaling and a respective transmission resource for transmitting the second uplink control channel message, where the second uplink control channel message may be transmitted in accordance with the second slot offset.

Some examples of the method, apparatuses, and non-transitory computer-readable medium described herein may further include operations, features, means, or instructions for receiving a first transmit power control (TPC) command indicative of a first TPC for transmission of the first uplink control channel message, where the first uplink control channel message may be transmitted in accordance with the first TPC and receiving a second TPC command indicative of a second TPC different from the first TPC for transmission of the second uplink control channel message, where the second uplink control channel message may be transmitted in accordance with the second TPC.

In some examples of the method, apparatuses, and non-transitory computer-readable medium described herein, the first payload includes the feedback indication and the second payload includes CSI.

In some examples of the method, apparatuses, and non-transitory computer-readable medium described herein, the first uplink control channel message includes a first format for uplink control channel messages and the second uplink control channel message includes a second format for uplink control channel messages different from the first format.

In some examples of the method, apparatuses, and non-transitory computer-readable medium described herein, the first uplink control channel message includes a first quantity of symbols and the second uplink control channel message includes a second quantity of symbols different from the first quantity of symbols.

A method for wireless communication at a base station is described. The method may include transmitting, to a UE, downlink signaling via at least one of a PCell, an SCell, or a combination thereof, receiving, via the PCell and based on the downlink signaling, a first uplink control channel message including a first payload, and receiving, via the SCell and based on the downlink signaling, the first uplink control channel message, or both, a second uplink control channel message including a second payload different from the first payload, where the second uplink control channel message includes a message configured via the downlink signaling or includes a feedback indication for the downlink signaling.

An apparatus for wireless communication at a base station is described. The apparatus may include a processor, memory coupled with the processor, and instructions stored in the memory. The instructions may be executable by the processor to cause the apparatus to transmit, to a UE, downlink signaling via at least one of a PCell, an SCell, or a combination thereof, receive, via the PCell and based on the downlink signaling, a first uplink control channel message including a first payload, and receive, via the SCell and based on the downlink signaling, the first uplink control channel message, or both, a second uplink control channel message including a second payload different from the first payload, where the second uplink control channel message includes a message configured via the downlink signaling or includes a feedback indication for the downlink signaling.

Another apparatus for wireless communication at a base station is described. The apparatus may include means for transmitting, to a UE, downlink signaling via at least one of a PCell, an SCell, or a combination thereof, means for receiving, via the PCell and based on the downlink signaling, a first uplink control channel message including a first payload, and means for receiving, via the SCell and based on the downlink signaling, the first uplink control channel message, or both, a second uplink control channel message including a second payload different from the first payload, where the second uplink control channel message includes a message configured via the downlink signaling or includes a feedback indication for the downlink signaling.

A non-transitory computer-readable medium storing code for wireless communication at a base station is described. The code may include instructions executable by a processor to transmit, to a UE, downlink signaling via at least one of a PCell, an SCell, or a combination thereof, receive, via the PCell and based on the downlink signaling, a first uplink control channel message including a first payload, and receive, via the SCell and based on the downlink signaling, the first uplink control channel message, or both, a second uplink control channel message including a second payload different from the first payload, where the second uplink control channel message includes a message configured via the downlink signaling or includes a feedback indication for the downlink signaling.

Some examples of the method, apparatuses, and non-transitory computer-readable medium described herein may further include operations, features, means, or instructions for receiving the first uplink control channel message via a first set of resources and receiving the second uplink control channel message via a second set of resources, where the first set of resources and the second set of resources at least partially overlap in a time domain.

Some examples of the method, apparatuses, and non-transitory computer-readable medium described herein may further include operations, features, means, or instructions for receiving the first uplink control channel message on a first component carrier simultaneously with receiving the second uplink control channel message on a second component carrier.

Some examples of the method, apparatuses, and non-transitory computer-readable medium described herein may further include operations, features, means, or instructions for transmitting first control signaling indicating a first set of resources for the first uplink control channel message, where the first uplink control channel message may be received within the first set of resources and transmitting second control signaling different from the first control signaling, the second control signaling indicating a second set of resources for the second uplink control channel message, where the second uplink control channel message may be received within the second set of resources.

In some examples of the method, apparatuses, and non-transitory computer-readable medium described herein, the first control signaling includes a first RRC message, a first DCI message, or both and the second control signaling includes a second RRC message, a second DCI message, or both.

Some examples of the method, apparatuses, and non-transitory computer-readable medium described herein may further include operations, features, means, or instructions for transmitting an indication of an uplink control channel resource configuration associated with the PCell and the SCell, where the first uplink control channel message and the second uplink control channel message may be received in accordance with the uplink control channel resource configuration.

Some examples of the method, apparatuses, and non-transitory computer-readable medium described herein may further include operations, features, means, or instructions for transmitting an indication of a first uplink control channel resource configuration associated with the PCell, where the first uplink control channel message may be received in accordance with the first uplink control channel resource configuration and transmitting an indication of a second uplink control channel resource configuration associated with the PCell, the second uplink control channel resource configuration different from the first uplink control channel resource configuration, where the second uplink control channel message may be received in accordance with the second uplink control channel resource configuration.

In some examples of the method, apparatuses, and non-transitory computer-readable medium described herein, the PCell may be associated with a PUCCH group and the method, apparatuses, and non-transitory computer-readable medium may include further operations, features, means, or instructions for transmitting an indication of an activation of the PUCCH group on the SCell, where receiving the second uplink control channel message may be based on the activation.

Some examples of the method, apparatuses, and non-transitory computer-readable medium described herein may further include operations, features, means, or instructions for identifying, based on the activation of the PUCCH group on the SCell, that the SCell includes a supplemental PUCCH cell configured for the SCell to receive and the UE to transmit supplemental uplink control channel messages, where receiving the second uplink control channel message may be based on identifying the SCell as a supplemental PUCCH cell.

Some examples of the method, apparatuses, and non-transitory computer-readable medium described herein may further include operations, features, means, or instructions for transmitting first control signaling indicating a first slot offset between reception of the downlink signaling and a respective transmission resource for transmitting the first uplink control channel message, where the first uplink control channel message may be received in accordance with the first slot offset and transmitting second control signaling indicating a second slot offset between reception of the downlink signaling and a respective transmission resource for transmitting the second uplink control channel message, where the second uplink control channel message may be received in accordance with the second slot offset.

Some examples of the method, apparatuses, and non-transitory computer-readable medium described herein may further include operations, features, means, or instructions for transmitting a first TPC command indicative of a first TPC for transmission of the first uplink control channel message, where the first uplink control channel message may be received in accordance with the first TPC and transmitting a second TPC command indicative of a second TPC different from the first TPC for transmission of the second uplink control channel message, where the second uplink control channel message may be received in accordance with the second TPC.

In some examples of the method, apparatuses, and non-transitory computer-readable medium described herein, the first payload includes the feedback indication and the second payload includes CSI.

In some examples of the method, apparatuses, and non-transitory computer-readable medium described herein, the first uplink control channel message includes a first format for uplink control channel messages and the second uplink control channel message includes a second format for uplink control channel messages different from the first format.

In some examples of the method, apparatuses, and non-transitory computer-readable medium described herein, the first uplink control channel message includes a first quantity of symbols and the second uplink control channel message includes a second quantity of symbols different from the first quantity of symbols.

A method of wireless communication at a UE is described. The method may include receiving a downlink transmission via at least one of a PCell, a SCell, or a combination thereof, identifying a feedback indication for the downlink transmission, transmitting a first feedback message that includes the feedback indication via the PCell, and transmitting a second feedback message that also includes the feedback indication via the SCell.

An apparatus for wireless communication at a UE is described. The apparatus may include a processor, memory coupled with the processor, and instructions stored in the memory. The instructions may be executable by the processor to cause the apparatus to receive a downlink transmission via at least one of a PCell, a SCell, or a combination thereof, identify a feedback indication for the downlink transmission, transmit a first feedback message that includes the feedback indication via the PCell, and transmit a second feedback message that also includes the feedback indication via the SCell.

Another apparatus for wireless communication at a UE is described. The apparatus may include means for receiving a downlink transmission via at least one of a PCell, a SCell, or a combination thereof, identifying a feedback indication for the downlink transmission, transmitting a first feedback message that includes the feedback indication via the PCell, and transmitting a second feedback message that also includes the feedback indication via the SCell.

A non-transitory computer-readable medium storing code for wireless communication at a UE is described. The code may include instructions executable by a processor to receive a downlink transmission via at least one of a PCell, a SCell, or a combination thereof, identify a feedback indication for the downlink transmission, transmit a first feedback message that includes the feedback indication via the PCell, and transmit a second feedback message that also includes the feedback indication via the SCell.

Some examples of the method, apparatuses, and non-transitory computer-readable medium described herein may further include operations, features, means, or instructions for receiving a grant scheduling the downlink transmission to the UE, the grant indicating that multi-cell uplink feedback message transmission may be enabled for the downlink transmission.

Some examples of the method, apparatuses, and non-transitory computer-readable medium described herein may further include operations, features, means, or instructions for identifying, based on the grant, that a first resource indication for transmission of the first feedback message and a second resource indication for transmission of the second feedback message may be jointly indicated within the grant as a same resource indication.

In some examples of the method, apparatuses, and non-transitory computer-readable medium described herein, the grant includes a one-bit field to enable or disable the multi-cell uplink feedback message transmission.

In some examples of the method, apparatuses, and non-transitory computer-readable medium described herein, the same resource indication includes at least a slot offset for transmission of the feedback indication relative to reception of the downlink transmission and a transmission resource for transmission of the feedback indication.

Some examples of the method, apparatuses, and non-transitory computer-readable medium described herein may further include operations, features, means, or instructions for identifying, based on the grant, that a first resource indication for transmission of the first feedback message and a second resource indication for transmission of the second feedback message may be independently indicated within the grant as separate resource indications.

In some examples of the method, apparatuses, and non-transitory computer-readable medium described herein, the first resource indication and the second resource indication each include at least a respective slot offset for transmission of the feedback indication relative to reception of the downlink transmission and a respective transmission resource for transmission of the feedback indication.

Some examples of the method, apparatuses, and non-transitory computer-readable medium described herein may further include operations, features, means, or instructions for identifying, based on the grant, a first resource for transmission of the first feedback message and a second resource for transmission of the second feedback message, where the first resource and the second resource may be both for feedback message transmission within a same transmission time interval.

In some examples of the method, apparatuses, and non-transitory computer-readable medium described herein, the same transmission time interval may be a one-symbol feedback transmission time interval.

Some examples of the method, apparatuses, and non-transitory computer-readable medium described herein may further include operations, features, means, or instructions for identifying, based on the grant, a first resource for transmission of the first feedback message and a second resource for transmission of the second feedback message, where the first resource and the second resource may be for feedback message transmission within different transmission time intervals.

Some examples of the method, apparatuses, and non-transitory computer-readable medium described herein may further include operations, features, means, or instructions for receiving a configuration signal configuring a PUCCH group that includes the PCell and the SCell, and identifying, from the configuration signal, that the SCell may be a supplemental PUCCH cell configured for the SCell to receive and the UE to transmit duplicate feedback for the PUCCH group.

In some examples of the method, apparatuses, and non-transitory computer-readable medium described herein, the configuration signal includes an RRC signal.

Some examples of the method, apparatuses, and non-transitory computer-readable medium described herein may further include operations, features, means, or instructions for receiving a transmit power control command, and identifying, based on the transmit power control command, a first power control for transmission of the first feedback message and a second power control for transmission of the second feedback message.

Some examples of the method, apparatuses, and non-transitory computer-readable medium described herein may further include operations, features, means, or instructions for transmitting power indicated by the transmit power control command may be split between the first power control and the second power control in accordance with a default ratio.

Some examples of the method, apparatuses, and non-transitory computer-readable medium described herein may further include operations, features, means, or instructions for transmitting power indicated by the transmit power control command may be split between the first power control and the second power control in accordance with a configuration message received by the UE.

Some examples of the method, apparatuses, and non-transitory computer-readable medium described herein may further include operations, features, means, or instructions for receiving a first transmit power control command indicative of a first transmit power control for transmission of the first feedback message, and receiving a second transmit power control command indicative of a second transmit power control for transmission of the second feedback message, where the first transmit power control command and the second transmit power control command may be separate from each other.

Some examples of the method, apparatuses, and non-transitory computer-readable medium described herein may further include operations, features, means, or instructions for identifying that a first uplink data transmission may be scheduled to overlap in time with one of the transmission of the first feedback message or the transmission of the second feedback message, and adhering to a feedback piggybacking rule in transmission of the first feedback message and transmission of the second feedback message, where the feedback piggybacking rule may be that a supplemental feedback message may be not multiplexed on a same uplink data transmission on which a primary feedback message may be multiplexed.

Some examples of the method, apparatuses, and non-transitory computer-readable medium described herein may further include operations, features, means, or instructions for multiplexing the first feedback message with the first uplink data transmission without multiplexing the second feedback message with the first uplink data transmission.

Some examples of the method, apparatuses, and non-transitory computer-readable medium described herein may further include operations, features, means, or instructions for multiplexing the second feedback message with the first uplink data transmission without multiplexing the first feedback message with the first uplink data transmission.

Some examples of the method, apparatuses, and non-transitory computer-readable medium described herein may further include operations, features, means, or instructions for transmitting the first feedback message on a first component carrier simultaneously with transmitting the second feedback message on a second component carrier, where a first resource indication for the first feedback message may be the same as or different than a second resource indication for the second feedback message.

Some examples of the method, apparatuses, and non-transitory computer-readable medium described herein may further include operations, features, means, or instructions for transmitting the first feedback message on a first component carrier before transmitting the second feedback message on a second component carrier, where a first resource indication for the first feedback message may be the same as or different than a second resource indication for the second feedback message.

A method of wireless communication at a base station is described. The method may include transmitting a downlink transmission to a UE via at least one of a PCell, a SCell, or a combination thereof, receiving, via the PCell, a first feedback message that includes a feedback indication for the downlink transmission, and receiving, via the SCell, a second feedback message from the UE that also includes the feedback indication for the downlink transmission.

An apparatus for wireless communication at a base station is described. The apparatus may include a processor, memory coupled with the processor, and instructions stored in the memory. The instructions may be executable by the processor to cause the apparatus to transmit a downlink transmission to a UE via at least one of a PCell, a SCell, or a combination thereof, receive, via the PCell, a first feedback message that includes a feedback indication for the downlink transmission, and receive, via the SCell, a second feedback message from the UE that also includes the feedback indication for the downlink transmission.

Another apparatus for wireless communication at a base station is described. The apparatus may include means for transmitting a downlink transmission to a UE via at least one of a PCell, a SCell, or a combination thereof, receiving, via the PCell, a first feedback message that includes a feedback indication for the downlink transmission, and receiving, via the SCell, a second feedback message from the UE that also includes the feedback indication for the downlink transmission.

A non-transitory computer-readable medium storing code for wireless communication at a base station is described. The code may include instructions executable by a processor to transmit a downlink transmission to a UE via at least one of a PCell, a SCell, or a combination thereof, receive, via the PCell, a first feedback message that includes a feedback indication for the downlink transmission, and receive, via the SCell, a second feedback message from the UE that also includes the feedback indication for the downlink transmission.

Some examples of the method, apparatuses, and non-transitory computer-readable medium described herein may further include operations, features, means, or instructions for transmitting a grant scheduling the downlink transmission to the UE, the grant indicating that multi-cell uplink feedback message transmission may be enabled for the downlink transmission.

Some examples of the method, apparatuses, and non-transitory computer-readable medium described herein may further include operations, features, means, or instructions for configuring the grant to indicate a first resource indication for transmission of the first feedback message and a second resource indication for transmission of the second feedback message, where the first resource indication and second resource indication may be jointly indicated within the grant as a same resource indication.

In some examples of the method, apparatuses, and non-transitory computer-readable medium described herein, the grant includes a one-bit field to enable or disable the multi-cell uplink feedback message transmission.

In some examples of the method, apparatuses, and non-transitory computer-readable medium described herein, the same resource indication includes at least a slot offset for reception of the feedback indication relative to transmission of the downlink transmission and a transmission resource for transmission of the feedback indication from the UE.

Some examples of the method, apparatuses, and non-transitory computer-readable medium described herein may further include operations, features, means, or instructions for configuring the grant to indicate a first resource indication for transmission of the first feedback message and a second resource indication for transmission of the second feedback message, where the first resource indication and second resource indication may be independently indicated within the grant as separate resource indications.

In some examples of the method, apparatuses, and non-transitory computer-readable medium described herein, the first resource indication and the second resource indication each include at least a slot offset for reception of the feedback indication relative to transmission of the downlink transmission and a respective transmission resource for transmission of the feedback indication from the UE.

Some examples of the method, apparatuses, and non-transitory computer-readable medium described herein may further include operations, features, means, or instructions for configuring the grant to indicate a first resource for transmission of the first feedback message and a second resource for transmission of the second feedback message, where the first resource and the second resource may be both for feedback message transmission within a same transmission time interval.

In some examples of the method, apparatuses, and non-transitory computer-readable medium described herein, the same transmission time interval may be a one-symbol feedback transmission time interval.

Some examples of the method, apparatuses, and non-transitory computer-readable medium described herein may further include operations, features, means, or instructions for configuring the grant to indicate a first resource for transmission of the first feedback message and a second resource for transmission of the second feedback message, where the first resource and the second resource may be for feedback message transmission within different transmission time intervals.

Some examples of the method, apparatuses, and non-transitory computer-readable medium described herein may further include operations, features, means, or instructions for transmitting a configuration signal configuring a PUCCH group that includes the PCell and the SCell, where the configuration signal indicates that the SCell may be a supplemental PUCCH cell configured to receive duplicate feedback for the PUCCH group.

In some examples of the method, apparatuses, and non-transitory computer-readable medium described herein, the configuration signal includes a RRC signal.

Some examples of the method, apparatuses, and non-transitory computer-readable medium described herein may further include operations, features, means, or instructions for transmitting a transmit power control command that indicates a first power control for transmission of the first feedback message and a second power control for transmission of the second feedback message.

Some examples of the method, apparatuses, and non-transitory computer-readable medium described herein may further include operations, features, means, or instructions for transmitting power indicated by the transmit power control command may be split between the first power control and the second power control in accordance with a default ratio.

Some examples of the method, apparatuses, and non-transitory computer-readable medium described herein may further include operations, features, means, or instructions for transmitting power indicated by the transmit power control command may be split between the first power control and the second power control in accordance with a configuration message transmitted to the UE.

Some examples of the method, apparatuses, and non-transitory computer-readable medium described herein may further include operations, features, means, or instructions for transmitting a first transmit power control command indicative of a first transmit power control for transmission of the first feedback message, and transmitting a second transmit power control command indicative of a second transmit power control for transmission of the second feedback message, where the first transmit power control command and the second transmit power control command may be separate from each other.

Some examples of the method, apparatuses, and non-transitory computer-readable medium described herein may further include operations, features, means, or instructions for receiving a first uplink data transmission from the UE, where one of the first feedback message or the second feedback message may be received multiplexed with the first uplink data transmission, and where another of the first feedback message or the second feedback message may be received separate from the first uplink data transmission.

Some examples of the method, apparatuses, and non-transitory computer-readable medium described herein may further include operations, features, means, or instructions for receiving the first feedback message on a first component carrier simultaneously with receiving the second feedback message on a second component carrier, where a first resource indication for the first feedback message may be the same as or different than a second resource indication for the second feedback message.

Some examples of the method, apparatuses, and non-transitory computer-readable medium described herein may further include operations, features, means, or instructions for receiving the first feedback message on a first component carrier before receiving the second feedback message on a second component carrier, where a first resource indication for the first feedback message may be the same as or different than a second resource indication for the second feedback message.

DETAILED DESCRIPTION

Figure 1:
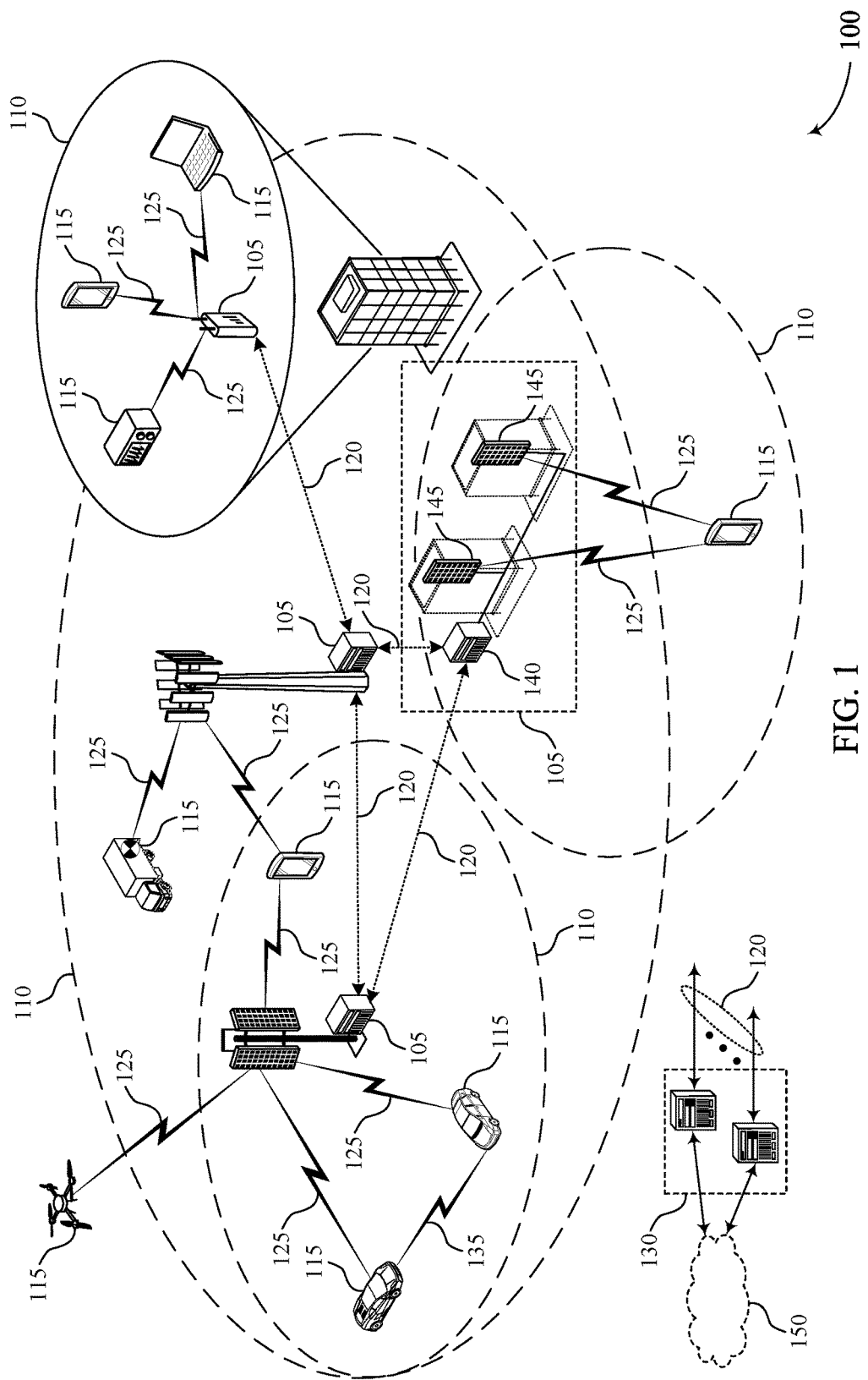
FIG. 1 illustrates an example of a system for wireless communications that supports parallel duplicated uplink control channels in uplink carrier aggregation in accordance with aspects of the present disclosure.

Wireless networks may support carrier aggregation-based communications in the uplink and/or downlink. This may include a user equipment (UE) communicating via a primary cell (PCell) and one or more secondary cells (SCell(s)). The PCell and SCell may be associated with the same base station. For example, the UE may receive a downlink transmission from the PCell and/or SCell over a downlink channel and/or transmit an uplink transmission to the PCell and/or SCell over an uplink channel. One example of such uplink communications may include, but is not limited to, hybrid automatic-repeat/request acknowledgment (HARQ-ACK) communications conveying feedback information over a physical uplink control channel (PUCCH) and/or a physical uplink shared channel (PUSCH). For example, the UE may receive a downlink transmission from the PCell and SCell, identify a feedback indication for the downlink transmission (e.g., determine whether the UE was able to successfully receive and decode the downlink transmission), and then convey the feedback indication to the cell in its configured PUCCH group. Typically, the PUCCH group only includes the PCell such that the feedback message transmission is limited to the PCell (e.g., the UE cannot transmit a feedback message to its SCell). This approach results in reduced reliability for the feedback message, which may disrupt communications between the UE and PCell/SCell.

Aspects of the disclosure are initially described in the context of wireless communications systems. Generally, the described techniques provide for duplicate HARQ-ACK feedback transmission in parallel on both a PCell and a SCell in a carrier aggregation scenario. For example, a base station may transmit or otherwise convey a downlink transmission to a UE via the PCell and/or SCell. The UE may identify the feedback indication for the downlink transmission (e.g., acknowledgment/negative-acknowledgment (ACK/NACK) information indicative of whether the UE was able to successfully receive and decode the downlink transmission). The UE may transmit or otherwise convey a first feedback message including the feedback indication to the PCell and a second feedback message including the feedback indication to the SCell. Generally, the first feedback message to the PCell may be considered a primary feedback message transmission and the second feedback message to the SCell may be an optional/supplementary feedback message transmission. In some aspects, the second feedback message to the SCell is to be turned on/off by the network (e.g., via the base station, PCell, and/or SCell). For example, a grant scheduling the downlink transmission for the UE may carry or otherwise convey an indication that multi-cell uplink feedback message transmission has been enabled for the downlink transmission. The supplemental feedback message may be turned on/off based on various factors, such as SCell uplink traffic, UE power headroom, the downlink traffic type (e.g., ultra-reliable/low latency communications (URLLC)), and the like. Accordingly, the described techniques support parallel feedback message transmission to both the PCell and the SCell when the UE is configured for carrier aggregation communications.

Additional aspects of the present disclosure may enable the simultaneous transmission of uplink control channel messages (e.g., PUCCH messages) across the multiple serving cells, such as a PCell and an SCell. In particular, some aspects of the present disclosure may enable UEs to transmit PUCCH messages in parallel (e.g., simultaneously) via a PCell and an SCell, where the simultaneously-transmitted PUCCH messages include different payloads, different PUCCH formats, or both. For example, a PUCCH message on the PCell may include HARQ feedback, where a PUCCH message on the SCell may include channel state information (CSI). In other words, aspects of the present disclosure may enable transmission of PUCCH messages with different formats/payloads on a PCell and an SCell which at least partially overlap in the time domain. In such cases, PUCCH transmissions on the SCell may be optional/supplementary to PUCCH transmissions on the PCell. In some implementations, PUCCH transmission on the SCell may be turned on and off (e.g., activated, deactivated) by the network based on one or more parameters or characteristics, including traffic (e.g., uplink traffic) on the SCell, power headroom (PHR) at the UE, and the like.

Aspects of the disclosure are further illustrated by and described with reference to apparatus diagrams, system diagrams, and flowcharts that relate to parallel duplicated uplink control channels in uplink carrier aggregation.

FIG. 1 illustrates an example of a wireless communications system 100 that supports parallel duplicated uplink control channels in uplink carrier aggregation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive a downlink transmission via at least one of a primary cell, a secondary cell, or a combination thereof. The UE 115 may identify a feedback indication for the downlink transmission. The UE 115 may transmit a first feedback message that includes the feedback indication via the primary cell. The UE 115 may transmit a second feedback message that also includes the feedback indication via the secondary cell.

A base station 105 (e.g., when configured as, or otherwise a part of a primary cell and/or secondary cell) may transmit a downlink transmission to a UE 115 via at least one of a primary cell, a secondary cell, or a combination thereof. The base station 105 may receive, via the primary cell, a first feedback message that includes a feedback indication for the downlink transmission. The base station 105 may receive, via the secondary cell, a second feedback message from the UE 115 that also includes the feedback indication for the downlink transmission.

Figure 2A:
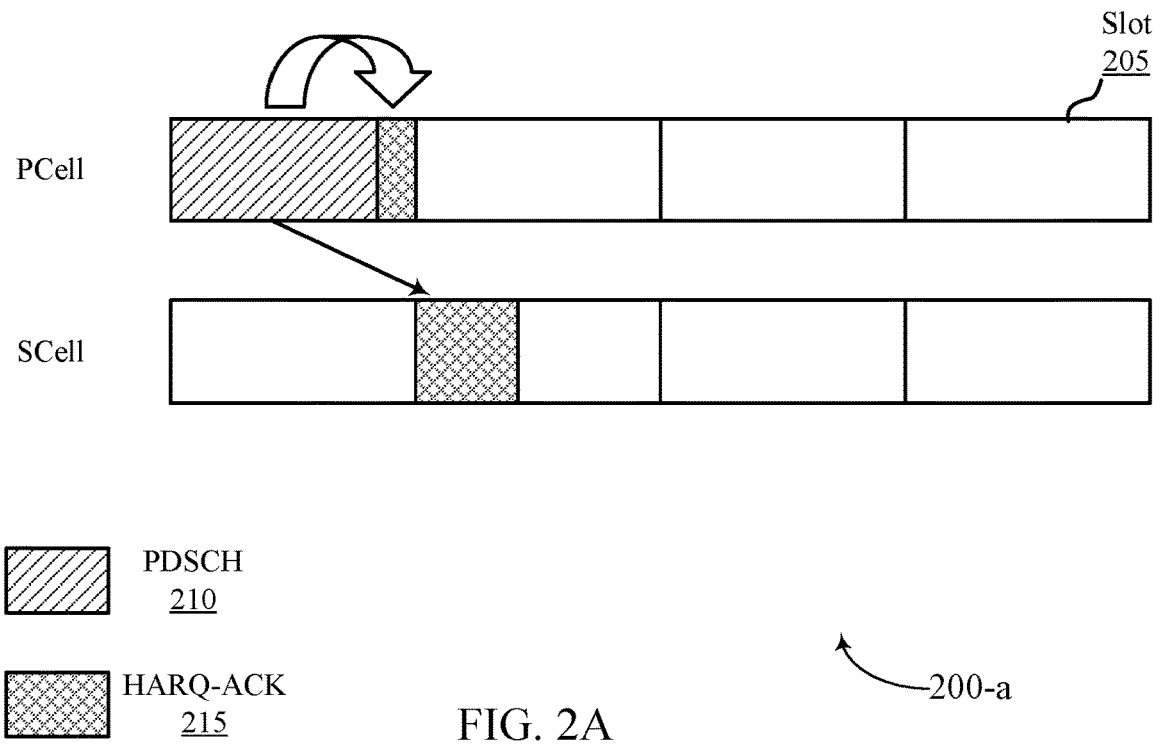
FIGS. 2A and 2B illustrate examples of a feedback configuration that supports parallel duplicated uplink control channels in uplink carrier aggregation in accordance with aspects of the present disclosure.
Figure 2B:
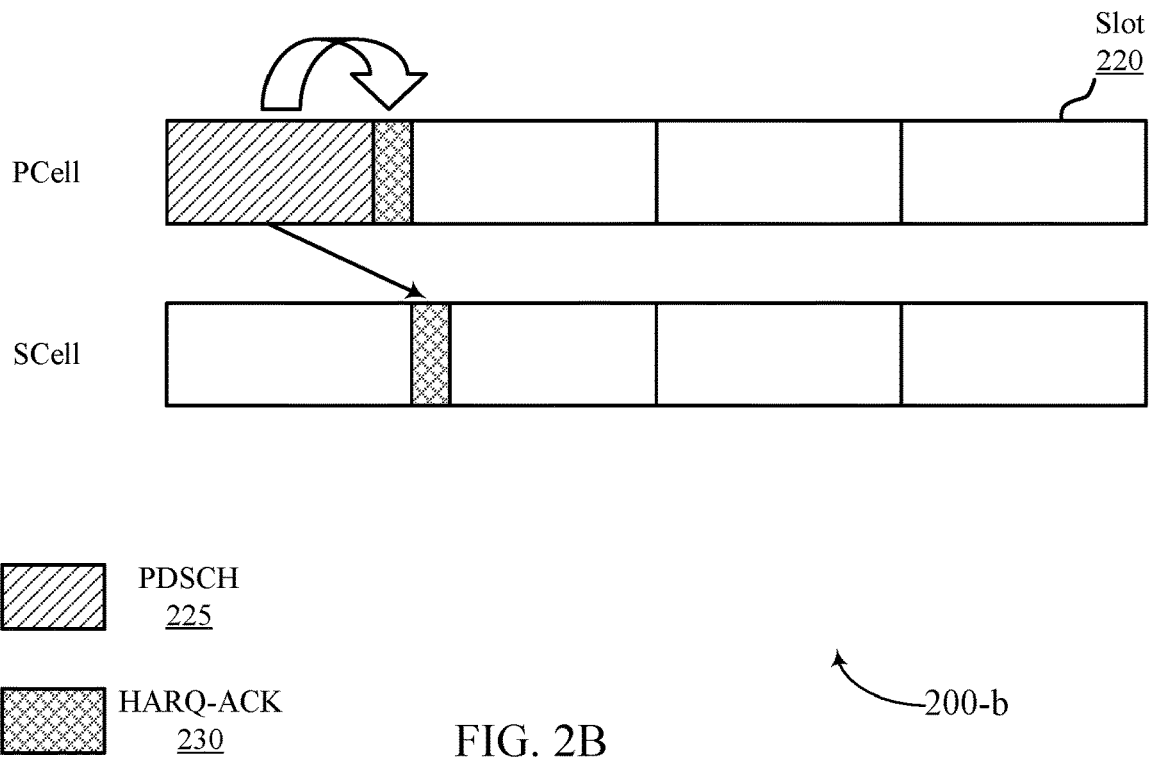

FIGS. 2A and 2B illustrate examples of a feedback configuration 200 that supports parallel duplicated uplink control channels in uplink carrier aggregation in accordance with aspects of the present disclosure. In some examples, feedback configuration 200 may implement aspects of wireless communication system 100. Aspects of feedback configuration 200 may be implemented by a base station (e.g., one or more base stations associated with a PCell and/or SCell) and/or a UE, which may be examples of corresponding devices described herein. In some aspects, the base station and UE may be performing communications using carrier aggregation techniques. Generally, feedback configuration 200-a of FIG. 2a illustrates an example where frequency hopping is performed across two component carriers that do not overlap in the time domain, but use different PUCCH lengths for the first feedback message and the second feedback message. Feedback configuration 200-b of FIG. 2B illustrates an example where frequency hopping is performed across two component carriers that do not overlap in the time domain, but use the same PUCCH length for the first feedback message and the second feedback message.

Wireless networks may support carrier aggregation-based communications in the uplink and/or downlink. This may include the UE communicating via a PCell and one or more SCell(s). For example, the UE may receive a downlink transmission from the PCell and/or SCell over a downlink channel (e.g., PDCCH/PDSCH) and/or transmit an uplink transmission to the PCell and/or SCell over an uplink channel (e.g., PUCCH/PUSCH). One example of such uplink communications may include, but is not limited to, HARQ-ACK communications conveying feedback information over PUCCH and/or PUSCH. For example, the UE may receive a downlink transmission from the PCell and SCell, identify a feedback indication for the downlink transmission (e.g., determine whether the UE was able to successfully receive and decode the downlink transmission), and then convey the feedback indication to the cell in its configured PUCCH group (e.g., the PCell). Typically, the PUCCH group only includes the PCell such that the feedback message transmission is limited to the PCell (e.g., the UE cannot transmit a feedback message to its SCell). This approach results in reduced reliability for the feedback message, which may disrupt communications between the UE and PCell/SCell.

Accordingly, the described techniques provide for duplicate HARQ-ACK feedback transmission in parallel on both a PCell and a SCell in a carrier aggregation scenario. For example, the base station may transmit or otherwise convey a downlink transmission (e.g., PDSCH 210/225) to the UE via the PCell and/or SCell (e.g., the PCell and SCell may be associated with the same base station or with different base stations). The downlink transmission may be received in one or more slots 205/220, with only one slot 205/225 being labeled for ease of reference. The UE may identify the feedback indication for the downlink transmission (e.g., ACK/NACK information indicative of whether the UE was able to successfully receive and decode the downlink transmission). The UE may transmit or otherwise convey a first feedback message (e.g., HARQ-ACK 215/230 during the first slot 205/220, in which slot 205 is the same slot in which the downlink transmission was received) including the feedback indication to the PCell and a second feedback message (e.g., HARQ-ACK 215/230 during the second slot 220, which is the slot 220 after the downlink transmission was received) including the feedback indication to the SCell.

Generally, the first feedback message to the PCell may be considered a primary feedback message transmission and the second feedback message to the SCell may be an optional/supplementary feedback message transmission. For example, the UE may be configured with a PUCCH group, e.g., via an RRC configuration signal that configures the PUCCH group for the UE. The base station may configure the SCell in the same PUCCH group as a supplemental PUCCH cell. This may enable the UE to provide supplementary and simultaneous HARQ-ACK transmission to the SCell, e.g., the UE may include the SCell in its feedback message transmissions.

In some aspects, the second feedback message to the SCell to be turned on/off by the network (e.g., via the base station, PCell, and/or SCell). For example, a grant scheduling the downlink transmission for the UE (e.g., a downlink control information (DCI) grant) may carry or otherwise convey an indication that multi-cell uplink feedback message transmission has been enabled for the downlink transmission. The supplemental feedback message (e.g., the second feedback message to the SCell) may be turned on/off based on various factors considered by the base station, such as SCell uplink traffic, UE power headroom, downlink transmission traffic type (e.g., URLLC), and the like.

In some aspects, the grant may also convey additional information that can be used for transmission of the feedback messages from the UE. In one example, the base station may guarantee that a certain PUCCH resource configuration is available for the PCell and the supplemental PUCCH SCell (e.g., the SCell receiving the second feedback message). That is, the grant may convey the same PUCCH resource indicator and K−1 values to be used for the first feedback message transmission to the PCell and the second feedback message transmission to the SCell. In one example, this may include one bit, field, parameter, etc., in the grant that is used to enable/disable the supplementary ACK/NACK feedback for the UE. Accordingly, the UE may identify, from the grant, a first resource indication for transmission of the first feedback message and a second resource indication for transmission of the second feedback message are jointly indicated within the grant as a same resource indication. Examples of the same resource indication may include, but are not limited to, the slot offset for transmission of the feedback indication relative to reception of the downlink transmission (e.g., the K1 value) and a transmission resource for transmission of the feedback indication (e.g., time, frequency, spatial, code, etc., resources for transmission of the feedback messages).

In another option, the grant may provide separate PUCCH resource indications for the PCell and supplemental PUCCH cell (e.g., the SCell). For example, a new bit, field, parameter, etc., in the downlink grant may indicate PUCCH and/or K1 values separately for the primary ACK/NACK feedback (e.g., to the PCell) and the supplemental ACK/NACK feedback (e.g., to the SCell). Accordingly, the UE may identify a first resource indication for transmission of the first feedback message and a second resource indication for transmission of the second feedback message are independently indicated within the grant as separate resource indications. Examples of the separately or independently indicated resource indications include, but are not limited to, the slot offset for transmission of the feedback indication relative to reception of the downlink transmission (e.g., K1 values), a respective transmission resource for transmission of the feedback indication (e.g., a separate transmission resource for transmission of the first feedback message and the second feedback message).

In some aspects, the grant may also indicate that the first resource indication for transmission of the first feedback message and a second resource indication for transmission of the second feedback message are both a feedback message transmission within a same transmission time interval (e.g., a one-symbol feedback transmission time interval, a one-slot feedback transmission time interval, etc.). In another example, the grant may indicate that the first resource indication for transmission of the first feedback message and the second resource indication for transmission of the second feedback message are for a feedback message transmission within different transmission time intervals (e.g., different symbol feedback transmission time intervals, different slots feedback transmission time intervals, and the like).

In some aspects, power control for feedback message transmission may be signaled or otherwise configured by the base station. In one example, no new power control command may be provided for the supplementary ACK/NACK feedback. Instead, primary and supplementary ACK/NACK feedback message transmission may split power semi-statically (e.g., half/half or follow an RRC configuration). In some aspects, the network may disable the supplementary ACK/NACK feedback transmission if it expects the SCell to experience a large path loss/deep fading based on the power headroom. For example, base station may transmit a power control command to the UE, which identifies the first power control for transmission of the first feedback message and a second power control for transmission of the second feedback message. In some examples, the transmit power indicated by the transmit power control command may be split between the first power control and the second power control in accordance with the default ratio (e.g., half/half). In other examples, the transmit power indicated by the transmit power control command may be split between the first power control and the second power control in accordance with the configuration message received by the UE (e.g., an RRC configuration message).

In another example, the base station may configure the UE with separate power control commands for the supplementary ACK/NACK feedback message transmission (e.g., transmission of the second feedback message). For example, the base station may transmit a first power control command indicative of a first transmit power control for transmission of the first feedback message and transmit a second transmit power control command indicative of a second transmit power control for transmission of the second feedback message. The first transmit power control command and the second transmit power control command may be separate from each other.

In some aspects, the supplementary ACK/NACK feedback message to the SCell may be multiplexed on the same PUSCH resource as the primary ACK/NACK feedback message to the PCell. That is, the first feedback message may be transmitted in the same PUSCH resource as the second feedback message. In this situation, the second feedback message to the SCell may be dropped if it is multiplexed on the same PUSCH resource as the first feedback message. For example, the UE may identify that a first uplink data transmission (e.g., PUSCH) is scheduled to overlap in time with transmission of the first feedback message and/or the second feedback message. Accordingly, the UE may adhere to a feedback piggybacking rule in transmission of the first feedback message and transmission of the second feedback message. The feedback piggybacking rule may be that a supplemental ACK/NACK feedback message (e.g., the second feedback message) is not multiplexed on the same uplink data transmission on which the primary feedback message (e.g., the first feedback message) is multiplexed. If the first uplink data transmission (e.g., PUSCH) overlaps in time with transmission of the first feedback message, but not with transmission of the second feedback message, the feedback piggybacking rule may include multiplexing the first feedback message with the first uplink data transmission, but without multiplexing the second feedback message with the first uplink data transmission. If the first uplink data transmission overlaps in time with transmission of the second feedback message, but not with the first feedback message, the feedback piggybacking rule may include multiplexing the second feedback message with the first uplink data transmission, but without multiplexing the first feedback message with the first uplink data transmission.

As discussed above, feedback configuration 200-a of FIG. 2a illustrates an example where frequency hopping is performed across two component carriers that do not overlap in the time domain, but use different PUCCH lengths for the first feedback message and the second feedback message. That is, feedback configuration 200-a of FIG. 2A illustrates an example where frequency hopping is performed such that the first and second feedback messages are transmitted to the PCell and SCell, respectively, using different component carriers. Moreover, the first and feedback messages are transmitted at different times, e.g., not simultaneously transmitted. Moreover, the PUCCH length for the first feedback message is different than the PUCCH length for the second feedback message, e.g., in the time/frequency domain.

As also discussed above, feedback configuration 200-b of FIG. 2B illustrates an example where frequency hopping is performed across two component carriers that do not overlap in the time domain, but use the same PUCCH length for the first feedback message and the second feedback message. That is, feedback configuration 200-b of FIG. 2B illustrates an example where frequency hopping is performed such that the first and second feedback messages are transmitted to the PCell and SCell, respectively, using different component carriers. Moreover, the first and feedback messages are transmitted at different times, e.g., not simultaneously transmitted. However, feedback configuration 200-b of FIG. 2B illustrates an example where the PUCCH length for the first feedback message is the same as the PUCCH length for the second feedback message, e.g., in the time/frequency domain.

Figure 3A:
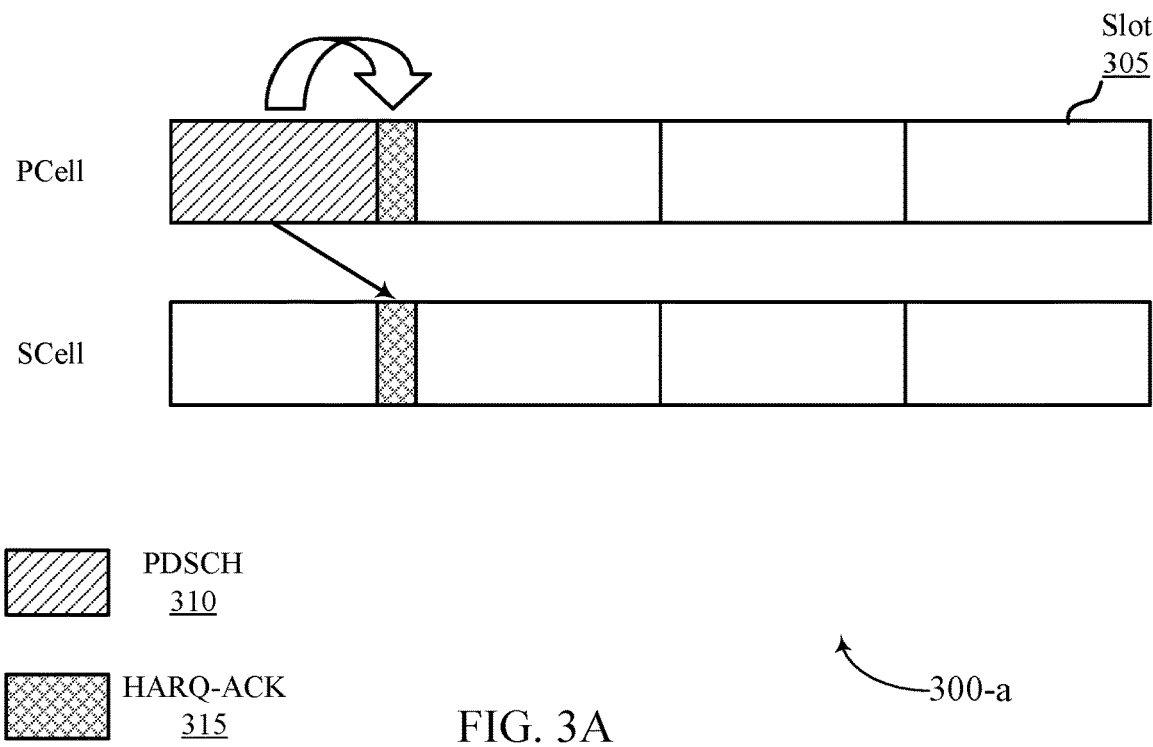
FIGS. 3A and 3B illustrate examples of a feedback configuration that supports parallel duplicated uplink control channels in uplink carrier aggregation in accordance with aspects of the present disclosure.
Figure 3B:
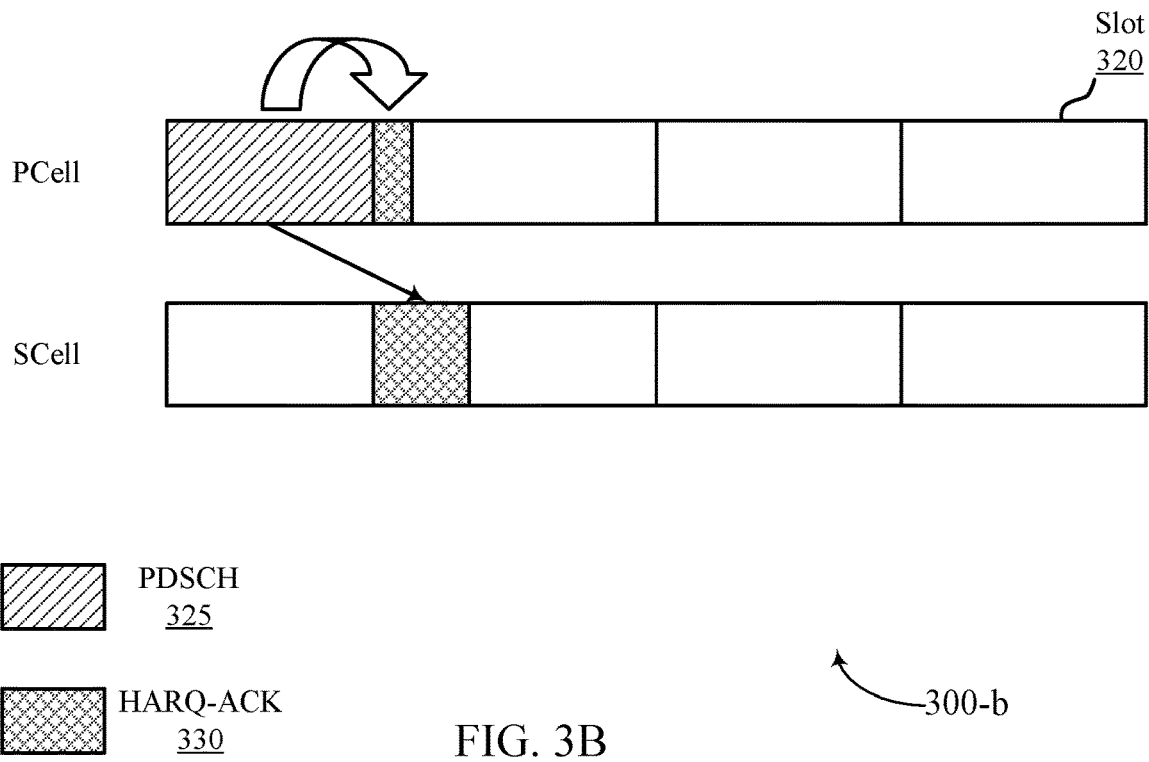

FIGS. 3A and 3B illustrate examples of a feedback configuration 300 that supports parallel duplicated uplink control channels in uplink carrier aggregation in accordance with aspects of the present disclosure. In some examples, feedback configuration 300 may implement aspects of wireless communication system 100 and/or feedback configuration 200. Aspects of feedback configuration 300 may be implemented by a base station (e.g., one or more base stations associated with a PCell and/or SCell) and/or a UE, which may be examples of corresponding devices described herein. In some aspects, the base station and UE may be performing communications using carrier aggregation techniques. Generally, feedback configuration 300-a of FIG. 3a illustrates an example where frequency hopping is performed across two component carriers that overlap in the time domain, and use the same PUCCH lengths for the first feedback message and the second feedback message. Feedback configuration 300-b of FIG. 3B illustrates an example where frequency hopping is performed across two component carriers that overlap in the time domain, but use different PUCCH lengths for the first feedback message and the second feedback message.

As discussed above, the described techniques provide for duplicate HARQ-ACK feedback transmission in parallel on both a PCell and a SCell in a carrier aggregation scenario. For example, the base station may transmit or otherwise convey a downlink transmission (e.g., PDSCH 310/325) to the UE via the PCell and/or SCell (e.g., the PCell and SCell may be associated with the same base station or with different base stations). The downlink transmission may be received in one or more slots 305/320, with one slot 305/320 being labeled for ease of reference. The UE may identify the feedback indication for the downlink transmission (e.g., ACK/NACK information indicative of whether the UE was able to successfully receive and decode the downlink transmission). The UE may transmit or otherwise convey a first feedback message (e.g., HARQ-ACK 315/330 during the first slot 305/320, which is also the slot 305/320 in which the downlink transmission was received) including the feedback indication to the PCell and a second feedback message (e.g., HARQ-ACK 315/330 also during the first slot 305, which is also the slot 305/320 that the downlink transmission was received) including the feedback indication to the SCell.

In some aspects, this may be based on the self-contained slot structure for the first slot 305 having only one symbol configured as either flexible (F) or uplink (U). That is, the first slot 305 may span 14 symbols (or some other number of symbols), with the slot structure being configured as DDDDDDDDDDDDDF, where D stands for a symbol configured for downlink (although the described techniques may also work with the last symbols configured as a U symbol). Simultaneous and duplicate transmission of the ACK/NACK feedback message (e.g., the first and second feedback messages conveying the feedback indication) to the PCell and SCell may support frequency hopping for the one-symbol ACK/NACK feedback.

As also discussed, the UE may be configured with a PUCCH group, e.g., via an RRC configuration signal that configures the PUCCH group for the UE. The base station may configure the SCell in the same PUCCH group as a supplemental PUCCH cell. The second feedback message to the SCell to be turned on/off by the network (e.g., via the base station, PCell, and/or SCell) by the grant scheduling the downlink transmission. The grant may also convey additional information that can be used for transmission of the feedback messages from the UE, e.g., in the same or separate resource indications. The grant may also indicate the transmission timer interval information for transmission of the first and second feedback messages.

Power control for feedback message transmission may be signaled or otherwise configured by the base station, e.g., using power control for the PCell feedback message transmission for the SCell feedback message transmission. In another example, the base station may configure the UE with separate power control commands for the supplementary ACK/NACK feedback message transmission (e.g., transmission of the second feedback message). Also, a feedback piggybacking rule may be applied depending on the overlap between a PUSCH transmission and the first and/or second feedback message transmission.

As discussed above, feedback configuration 300-a of FIG. 3a illustrates an example where frequency hopping is performed across two component carriers that overlap in the time domain, and use the same PUCCH length for the first feedback message and the second feedback message. That is, feedback configuration 300-a of FIG. 3A illustrates an example where frequency hopping is performed such that the first and second feedback messages are transmitted to the PCell and SCell, respectively, using different component carriers. Moreover, the first and feedback messages are transmitted at the same time, e.g., simultaneously transmitted. Moreover, the PUCCH length for the first feedback message is the same as the PUCCH length for the second feedback message, e.g., in the time/frequency domain.

As also discussed above, feedback configuration 300-b of FIG. 3B illustrates an example where frequency hopping is performed across two component carriers that overlap in the time domain, but use different PUCCH lengths for the first feedback message and the second feedback message. That is, feedback configuration 300-b of FIG. 3B illustrates an example where frequency hopping is performed such that the first and second feedback messages are transmitted to the PCell and SCell, respectively, using different component carriers. Moreover, the first and feedback messages are transmitted at the same time, e.g., simultaneously transmitted. However, feedback configuration 300-b of FIG. 3B illustrates an example where the PUCCH length for the first feedback message is different than the PUCCH length for the second feedback message, e.g., in the time/frequency domain.

Figure 4A:
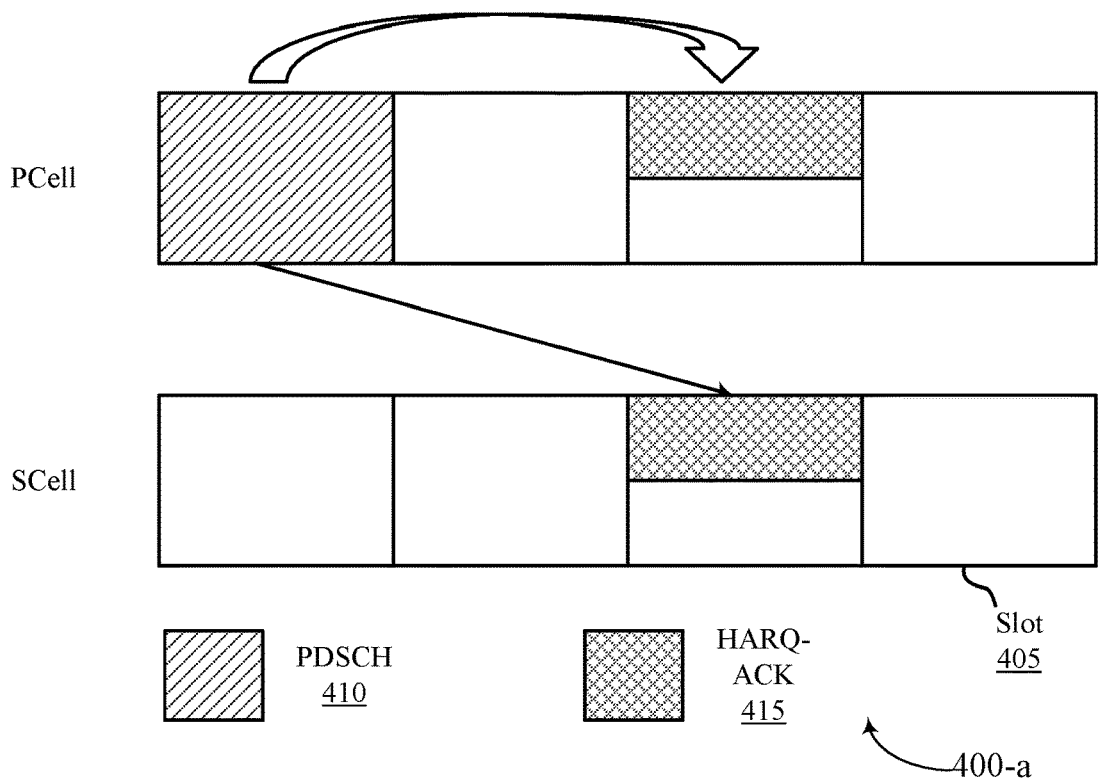
FIGS. 4A and 4B illustrate examples of a feedback configuration that supports parallel duplicated uplink control channels in uplink carrier aggregation in accordance with aspects of the present disclosure.
Figure 4B:
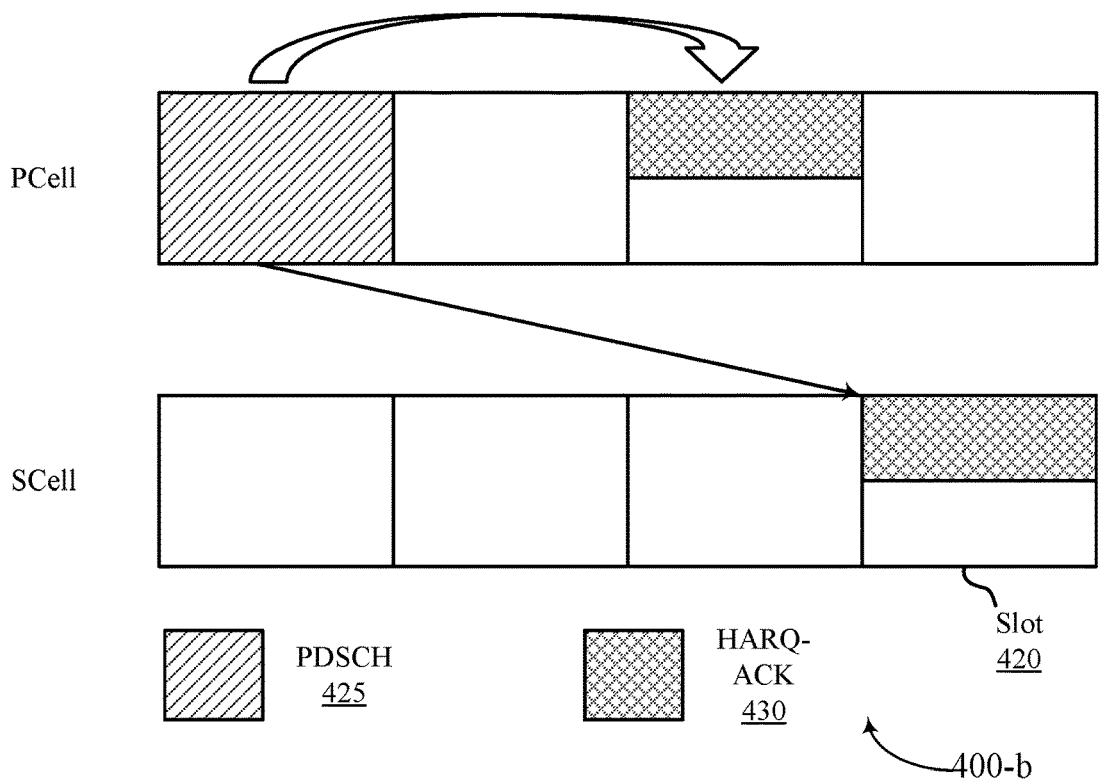

FIGS. 4A and 4B illustrate examples of a feedback configuration 400 that supports parallel duplicated uplink control channels in uplink carrier aggregation in accordance with aspects of the present disclosure. In some examples, feedback configuration 400 may implement aspects of wireless communication system 100 and/or feedback configurations 200 and/or 300. Aspects of feedback configuration 400 may be implemented by a base station (e.g., one or more base stations associated with a PCell and/or SCell) and/or a UE, which may be examples of corresponding devices described herein. In some aspects, the base station and UE may be performing communications using carrier aggregation techniques. Broadly, feedback configuration 400-a of FIG. 4A illustrates an example where the first and second feedback messages are transmitted during the same slot and feedback configuration 400-b of FIG. 4B illustrates an example where the first and second feedback messages are transmitted during different slots.

In some situations, the UE may be a reduced capability UE (e.g., a NR-Light UE) with carrier aggregation capability. However, each component carrier may be relatively narrow (e.g., 5 MHz). Feedback configuration 400 illustrates an example where parallel HARQ-ACK feedback or HARQ-ACK feedback with frequency hopping across component carriers increases the frequency diversity. That is, feedback configuration 400 support frequency hopping being enabled to achieve frequency diversity.

For example, and with reference to feedback configuration 400-a of FIG. 4A, the base station may transmit or otherwise convey a downlink transmission (e.g., PDSCH 410) to the UE via the PCell and/or SCell (e.g., the PCell and SCell may be associated with the same base station or with different base stations). The downlink transmission may be received in one or more slots 405, with one slot 405 being labeled for ease of reference. The UE may identify the feedback indication for the downlink transmission (e.g., ACK/NACK information indicative of whether the UE was able to successfully receive and decode the downlink transmission). The UE may transmit or otherwise convey a first feedback message (e.g., HARQ-ACK 415 during the third slot 405, which is two slots 405 after the downlink transmission was received and based on the K1 value) including the feedback indication to the PCell and a second feedback message (e.g., HARQ-ACK 415 also during the third slot 405, which is also two slots 405 after the downlink transmission was received and based on the K1 value) including the feedback indication to the SCell.

As another example and with reference to feedback configuration 400-b of FIG. 4B, the base station may transmit or otherwise convey a downlink transmission (e.g., PDSCH 425) to the UE via the PCell and/or SCell (e.g., the PCell and SCell may be associated with the same base station or with different base stations). The downlink transmission may be received in one or more slots 420, with one slot 420 being labeled for ease of reference. The UE may identify the feedback indication for the downlink transmission (e.g., ACK/NACK information indicative of whether the UE was able to successfully receive and decode the downlink transmission). The UE may transmit or otherwise convey a first feedback message (e.g., HARQ-ACK 430 during the third slot 420, which is two slots 420 after the downlink transmission was received and based on the K1 value) including the feedback indication to the PCell and a second feedback message (e.g., HARQ-ACK 430 during the fourth slot 420, which is three slots 420 after the downlink transmission was received) including the feedback indication to the SCell. The first and second feedback messages may be transmitted on separate component carriers to achieve frequency hopping/diversity.

As also discussed, the UE may be configured with a PUCCH group, e.g., via an RRC configuration signal that configures the PUCCH group for the UE. The base station may configure the SCell in the same PUCCH group as a supplemental PUCCH cell. The second feedback message to the SCell to be turned on/off by the network (e.g., via the base station, PCell, and/or SCell) by the grant scheduling the downlink transmission. The grant may also convey additional information that can be used for transmission of the feedback messages from the UE, e.g., in the same or separate resource indications. The grant may also indicate the transmission timer interval information for transmission of the first and second feedback messages.

Power control for feedback message transmission may be signaled or otherwise configured by the base station, e.g., using power control for the PCell feedback message transmission for the SCell feedback message transmission. In another example, the base station may configure the UE with separate power control commands for the supplementary ACK/NACK feedback message transmission (e.g., transmission of the second feedback message). Also, a feedback piggybacking rule may be applied depending on the overlap between a PUSCH transmission and the first and/or second feedback message transmission.

Figure 5:
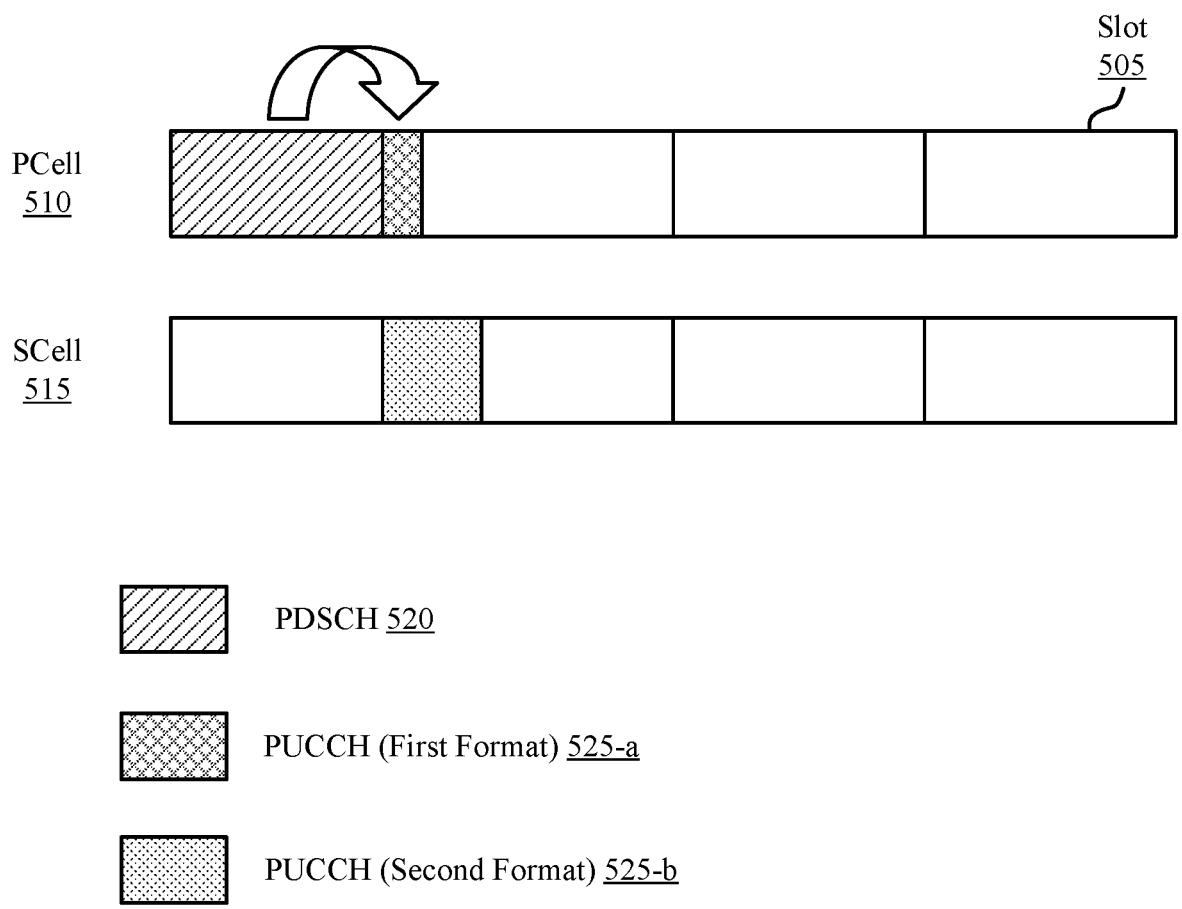
FIG. 5 illustrates an example of a feedback configuration that supports parallel uplink control channels in uplink carrier aggregation in accordance with aspects of the present disclosure.

FIG. 5 illustrates an example of a resource configuration 500 that supports parallel uplink control channels in uplink carrier aggregation in accordance with aspects of the present disclosure. In some examples, resource configuration 500 may implement aspects of wireless communication system 100 and/or feedback configurations 200 and/or 300. Aspects of resource configuration 500 may be implemented by a base station 105 (e.g., one or more base stations associated with a PCell and/or SCell) and/or a UE 115, which may be examples of corresponding devices described herein. In some aspects, the base station 105 and UE 115 may be performing communications using carrier aggregation techniques.

As noted previously herein, in some wireless communications systems, PUCCH communications for a respective PUCCH group may only be transmitted via a PCell, and may not be transmitted via an SCell. That is, in some wireless communications systems, PUCCH communications may only be transmitted via the PCell 510, and may not be transmitted via the SCell 515. However, such limitations may result in reduced reliability for the PUCCH messages, which may disrupt communications between the UE 115 and PCell 510/SCell 515, which may reduce latency within the wireless communications system.

Accordingly, some aspects of the present disclosure may enable UEs 115 to transmit PUCCH messages in parallel (e.g., simultaneously) via the PCell 510 and the SCell 515. In other words, aspects of the present disclosure may enable UEs 115 to transmit PUCCH messages via the PCell 510 and the SCell 515 which at least partially overlap in the time domain. In some implementations, such overlapping PUCCH messages may carry different payloads, exhibit different PUCCH formats, include different quantities of symbols, or any combination thereof. In such cases, PUCCH transmissions on the SCell 515 may be optional/supplementary to PUCCH transmissions on the PCell 510 (e.g., PCell 510 PUCCH transmission may be mandatory, where SCell 515 PUCCH transmission may be optional/supplementary). Moreover, PUCCH transmission on the SCell 515 may be turned on and off (e.g., activated, deactivated) by the network based on one or more parameters or characteristics, including traffic (e.g., uplink traffic) on the SCell 515, UE 115 PHR, and the like.

For example, a base station 105 may transmit or otherwise convey downlink signaling (e.g., PDSCH 520) to a UE 115 via the PCell 510 and/or SCell 515 (e.g., the PCell 510 and SCell 515 may be associated with the same base station 105 or with different base stations 105). For instance, as shown in FIG. 5, the UE 115 may receive a PDSCH 520 via the PCell 510. In some aspects, the UE 115 may identify a feedback indication for the downlink transmission (e.g., ACK/NACK information indicative of whether the UE 115 was able to successfully receive and decode the PDSCH 520). In this example, the UE 115 may transmit a first PUCCH message 525-*a* via the PCell 510, and may transmit a second PUCCH message 525-*b* via the SCell 515. Additionally, or alternatively, the UE 115 may identify one or more messages configured via the downlink signaling (e.g., messages configured via the PDSCH 520). For instance, the UE 115 may identify PUCCH messages 525 including CSI (e.g., periodic CSI, semi-persistent CSI), scheduling requests, or both, which are configured via the PDSCH 520.

In some cases, the first PUCCH message 525-*a* and the second PUCCH message 525-*b* may at least partially overlap in a time domain. For example, the first PUCCH message 525-*a* may be transmitted via a first set of resources, and the second PUCCH message 525-*b* may be transmitted via a second set of resources which at least partially overlaps with the first set of resources in the time domain. In this regard, the first PUCCH message 525-*a* and the second PUCCH message 525-*b* may be transmitted simultaneously on different component carriers. In some aspects, the PUCCH messages 525 may be scheduled to be transmitted within explicitly indicated resources. In additional or alternative implementations, the resources used to transmit the PUCCH messages 525 may be indicated via offsets (e.g., slot offsets) measured relative to some other transmission or reference point, such as the PDSCH 520. For instance, the UE 115 may receive an indication of a first offset (e.g., slot offset defining a quantity of slots 505, symbol offset defining a quantity of symbols) between reception of the PDSCH 520 and a first transmission resource for transmitting the first PUCCH message 525-*a*, and a second offset (e.g., slot offset defining a quantity of slots 505, symbol offset defining a quantity of symbols) between reception of the PDSCH 520 and a second transmission resource for transmitting the second PUCCH message 525-*b*.

The UE 115 may be configured to transmit the first PUCCH message 525-*a* based on (e.g., in response to) the PDSCH 520. Moreover, the UE 115 may be configured to transmit the second PUCCH message 525-*b* based on receiving the PDSCH 520, transmitting the first PUCCH message 525-*a*, or both. In some implementations, the PUCCH messages 525 may have different payloads, exhibit different formats (e.g., different PUCCH formats), include different quantities of symbols, or any combination thereof. For example, in some aspects, the first PUCCH message 525-*a* may include a first payload, and the second PUCCH message 525-*b* may include a second payload which is different from the first payload. For instance, the first PUCCH message 525-*a* may include a feedback indication (e.g., HARQ feedback) for the PDSCH 520, where the second PUCCH message 525-*b* may include CSI. In general, the first PUCCH message 525-*a* and the second PUCCH message 525-*b* may together include different combinations of UCI payloads including, but not limited to: HARQ feedback, scheduling requests (SRs), CSI (e.g., periodic or semi-persistent CSI), and the like. For instance, the first PUCCH message 525-*a* and the second PUCCH message 525-*b* may include HARQ-ACK+SR, HARQ-ACK+periodic or semi-persistent CSI, SR+periodic or semi-persistent CSI, and the like. By way of another example, the first PUCCH message 525-*a* may include a first format (e.g., PUCCH format 0 with one OFDM symbol), where the second PUCCH message 525-*b* may include a second format which is different from the first format (e.g., PUCCH format 3 with eight OFDM symbols).

In some aspects, the SCell 515 may be configured within a same PUCCH group as a supplemental PUCCH cell. That is, the PCell 510 may be associated with a PUCCH group, and the respective PUCCH group may be activated on the SCell 515. For example, the PCell 510 may be associated with a PUCCH group, and the PDSCH 520 (or other downlink signaling) may include an activation of the PUCCH group on the SCell 515. In this regard, the UE 115 may be configured to transmit the second PUCCH message 525-*b* via the SCell 515 based on the activation of the PUCCH group on the SCell 515. That is, supplementary simultaneous transmission of the PUCCH messages 525 may be enabled on the supplemental PUCCH cell (e.g., based on the activation of the PUCCH group on the SCell 515). In this regard, the UE 115 may be configured to identify the SCell 515 as a supplemental PUCCH cell configured for transmitting/receiving supplemental PUCCH messages, and may transmit the second PUCCH message 525-*b* via the SCell 515 based on identifying the SCell 515 as a secondary PUCCH cell.

In some aspects, the PUCCH messages 525 on the respective PCell 510 and SCell 515 may be scheduled with dedicated signaling. That is, PUCCH messages 525 on the SCell 515 may be scheduled via dedicated control signaling which is separate from control signaling used to schedule PUCCH messages 525 on the PCell 510. For example, in some cases, the UE 115 may receive first control signaling (e.g., first RRC message, first DCI message) which schedules the first PUCCH message 525-*a* on the PCell 510, and may receive second control signaling (e.g., second RRC message, second DCI message) which schedules the second PUCCH message 525-*b* on the SCell 515. In some cases, the control signaling used to schedule the PUCCH messages 525 on the PCell 510 and the SCell 515 may be received on same or different cells/component carriers as the scheduled PUCCH messages 525. In some implementations, the first PUCCH message 525-*a*, the second PUCCH message 525-*b*, or both, may be configured (e.g., scheduled, triggered, activated) via the PDSCH 520

In some aspects, the PUCCH resource configuration(s) for the SCell 515 may be the same or different as the PUCCH resource configuration(s) for the PCell 510. For example, in some cases, the PCell 510 and the SCell 515 may be associated with the same PUCCH resource configuration. In such cases, the network may guarantee the same PUCCH resource configuration between/across the PCell 510 and the supplemental PUCCH cell (e.g., SCell 515). In such cases, the UE 115 may transmit the first PUCCH message 525-*a* and the second PUCCH message 525-*b* in accordance with the common PUCCH resource configuration. In additional or alternative implementations, the PCell 510 and the SCell 515 may be associated with different (e.g., separate, distinct) PUCCH resource configurations. For example, the UE 115 may receive an indication of a first PUCCH resource configuration associated with the PCell 510, and a second PUCCH resource configuration associated with the SCell 515. In this example, the UE 115 may transmit the first PUCCH message 525-*a* and the second PUCCH message 525-*b* in accordance with the first PUCCH resource configuration and the second PUCCH resource configuration, respectively.

In some implementations, the first PUCCH message 525-*a* with the first payload/format and the second PUCCH message 525-*b* with the second payload/format may be configured with separate power control commands. That is, separate power control commands may be used for PUCCH messages 525 on the supplementary PUCCH cell (e.g., SCell 515). For example, in some cases, the UE 115 may receive a first TPC command indicative of a first TPC for transmission of the first PUCCH message 525-*a*, and may receive a second TPC command indicative of a second TPC for transmission of the second PUCCH message 525-*b*, where the second TPC is different from the first TPC. In such cases, the first PUCCH message 525-*a* and the second PUCCH message 525-*b* may be transmitted in accordance with the first TPC and the second TPC, respectively.

In some implementations, the resource configuration 500 illustrated in FIG. 5 may enable the simultaneous transmission of PUCCH messages 525 across the PCell 510 and the SCell 515. In particular, the resource configuration 500 may enable the simultaneous transmission of multiple PUCCH messages 525 (e.g., supplemental PUCCH messages 525) which include different formats/payloads across multiple serving cells.

Figure 6:
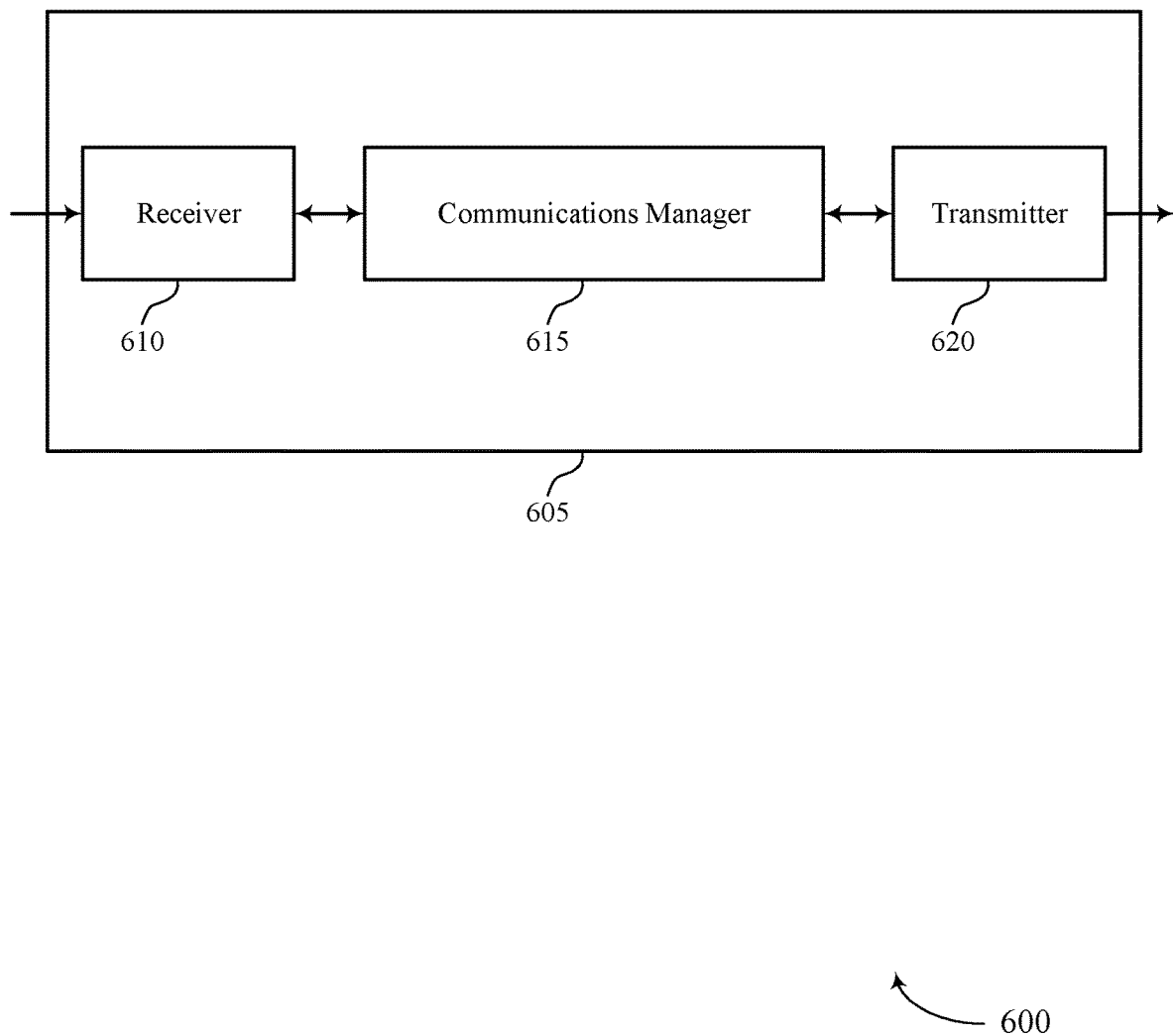
FIGS. 6 and 7 show block diagrams of devices that support parallel duplicated uplink control channels in uplink carrier aggregation in accordance with aspects of the present disclosure.

FIG. 6 shows a block diagram 600 of a device 605 that supports parallel duplicated uplink control channels in uplink carrier aggregation in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to parallel duplicated uplink control channels in uplink carrier aggregation, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive a downlink transmission via at least one of a PCell, a SCell, or a combination thereof, identify a feedback indication for the downlink transmission, transmit a first feedback message that includes the feedback indication via the PCell, and transmit a second feedback message that also includes the feedback indication via the SCell. The communications manager 615 may be an example of aspects of the communications manager 805 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

For example, the communications manager 615 may be configured as or otherwise support a means for receiving a downlink transmission via at least one of a PCell, an SCell, or a combination thereof. The communications manager 615 may be configured as or otherwise support a means for identifying one or more messages configured via the downlink signaling, a feedback indication for the downlink signaling, or both. The communications manager 615 may be configured as or otherwise support a means for transmitting, via the PCell and based on the downlink signaling, a first uplink control channel message including a first payload. The communications manager 615 may be configured as or otherwise support a means for transmitting, via the SCell and based on the downlink signaling, the first uplink control channel message, or both, a second uplink control channel message including a second payload different from the first payload, where the first payload or the second payload includes the feedback indication.

Figure 7:
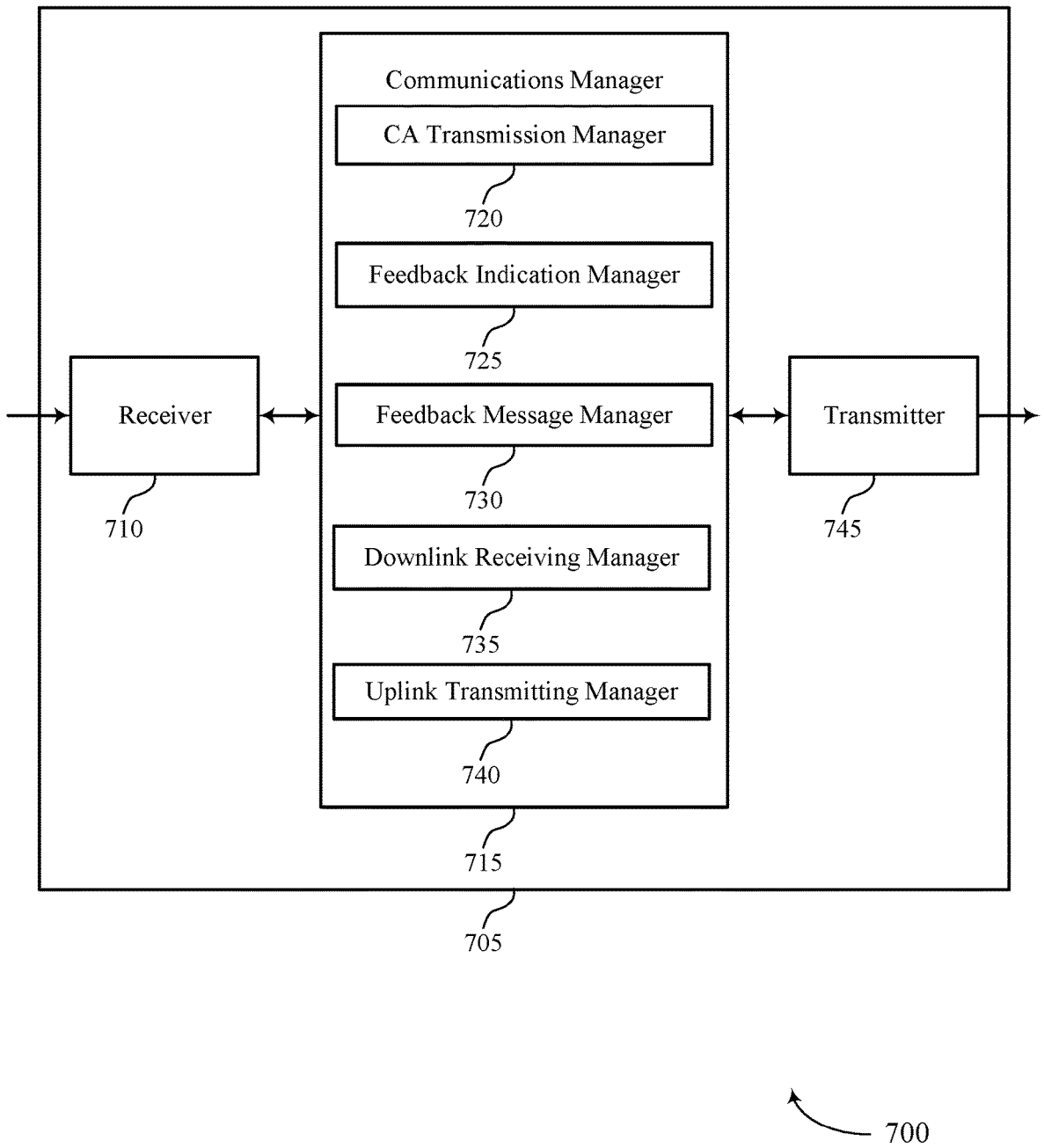

FIG. 7 shows a block diagram 700 of a device 705 that supports parallel duplicated uplink control channels in uplink carrier aggregation in accordance with aspects of the present disclosure. The device 705 may be an example of aspects of a device 605, or a UE 115 as described herein. The device 705 may include a receiver 710, a communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to parallel duplicated uplink control channels in uplink carrier aggregation, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a CA transmission manager 720, a feedback indication manager 725, a feedback message manager 730, a downlink receiving manager 735, and an uplink transmitting manager 740. The communications manager 715 may be an example of aspects of the communications manager 910 described herein.

The CA transmission manager 720 may receive a downlink transmission via at least one of a PCell, a SCell, or a combination thereof.

The feedback indication manager 725 may identify a feedback indication for the downlink transmission.

The feedback message manager 730 may transmit a first feedback message that includes the feedback indication via the PCell and transmit a second feedback message that also includes the feedback indication via the SCell.

The downlink receiving manager 735 may be configured as or otherwise support a means for receiving downlink signaling (e.g., a downlink transmission) via at least one of a PCell, an SCell, or a combination thereof. The feedback indication manager 725 may be configured as or otherwise support a means for identifying one or more messages configured via the downlink signaling, a feedback indication for the downlink signaling, or both. The uplink transmitting manager 740 may be configured as or otherwise support a means for transmitting, via the PCell and based on the downlink signaling, a first uplink control channel message including a first payload. The uplink transmitting manager 740 may be configured as or otherwise support a means for transmitting, via the SCell and based on the downlink signaling, the first uplink control channel message, or both, a second uplink control channel message including a second payload different from the first payload, where the first payload or the second payload includes the feedback indication.

The transmitter 745 transmit signals generated by other components of the device 705. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or a set of antennas.

Figure 8:
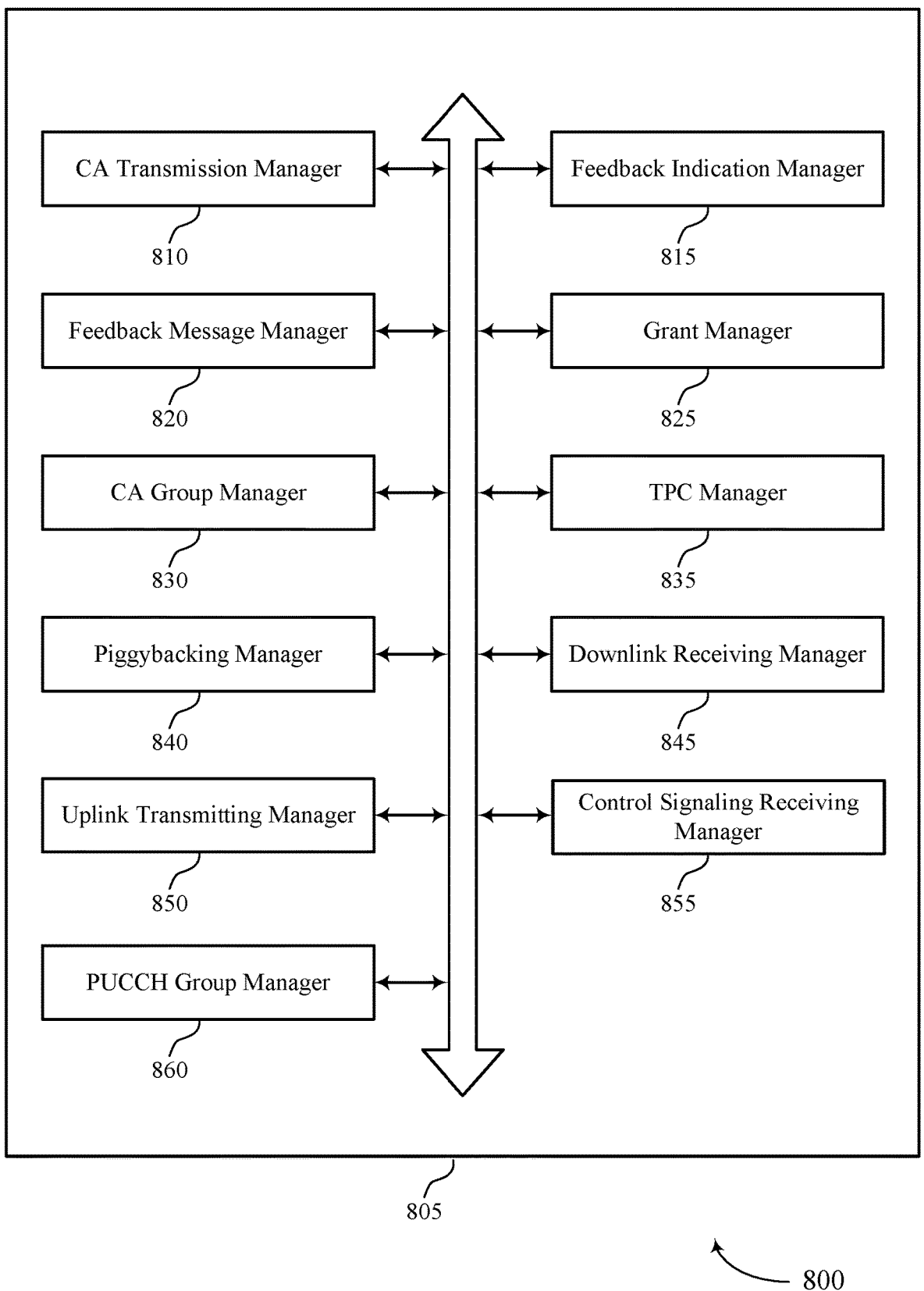
FIG. 8 shows a block diagram of a communications manager that supports parallel duplicated uplink control channels in uplink carrier aggregation in accordance with aspects of the present disclosure.

FIG. 8 shows a block diagram 800 of a communications manager 805 that supports parallel duplicated uplink control channels in uplink carrier aggregation in accordance with aspects of the present disclosure. The communications manager 805 may be an example of aspects of a communications manager 615 or a communications manager 715 described herein. The communications manager 805 may include a CA transmission manager 810, a feedback indication manager 815, a feedback message manager 820, a grant manager 825, a CA group manager 830, a TPC manager 835, a piggybacking manager 840, a downlink receiving manager 845, an uplink transmitting manager 850, a control signaling receiving manager 856, and a PUCCH group manager 860. Each of these modules may communicate, directly or indirectly, with one another (e.g., via one or more buses).

The CA transmission manager 810 may receive a downlink transmission via at least one of a PCell, a SCell, or a combination thereof.

The feedback indication manager 815 may identify a feedback indication for the downlink transmission.

The feedback message manager 820 may transmit a first feedback message that includes the feedback indication via the PCell. In some examples, the feedback message manager 820 may transmit a second feedback message that also includes the feedback indication via the SCell. In some examples, the feedback message manager 820 may transmit the first feedback message on a first component carrier simultaneously with transmitting the second feedback message on a second component carrier, wherein a first resource indication for the first feedback message is the same as or different than a second resource indication for the second feedback message. In some examples, the feedback message manager 820 may transmit the first feedback message on a first component carrier before transmitting the second feedback message on a second component carrier, wherein a first resource indication for the first feedback message is the same as or different than a second resource indication for the second feedback message.

The grant manager 825 may receive a grant scheduling the downlink transmission to the UE, the grant indicating that multi-cell uplink feedback message transmission is enabled for the downlink transmission. In some examples, the grant manager 825 may identify, based on the grant, that a first resource indication for transmission of the first feedback message and a second resource indication for transmission of the second feedback message are jointly indicated within the grant as a same resource indication. In some examples, the grant manager 825 may identify, based on the grant, that a first resource indication for transmission of the first feedback message and a second resource indication for transmission of the second feedback message are independently indicated within the grant as separate resource indications.

In some examples, the grant manager 825 may identify, based on the grant, a first resource for transmission of the first feedback message and a second resource for transmission of the second feedback message, where the first resource and the second resource are both for feedback message transmission within a same transmission time interval. In some examples, the grant manager 825 may identify, based on the grant, a first resource for transmission of the first feedback message and a second resource for transmission of the second feedback message, where the first resource and the second resource are for feedback message transmission within different transmission time intervals. In some cases, the grant includes a one-bit field to enable or disable the multi-cell uplink feedback message transmission. In some cases, the same resource indication includes at least a slot offset for transmission of the feedback indication relative to reception of the downlink transmission and a transmission resource for transmission of the feedback indication.

In some cases, the first resource indication and the second resource indication each include at least a respective slot offset for transmission of the feedback indication relative to reception of the downlink transmission and a respective transmission resource for transmission of the feedback indication. In some cases, the same transmission time interval is a one-symbol feedback transmission time interval.

The CA group manager 830 may receive a configuration signal configuring a PUCCH group that includes the PCell and the SCell. In some examples, the CA group manager 830 may identify, from the configuration signal, that the SCell is a supplemental PUCCH cell configured for the SCell to receive and the UE to transmit duplicate feedback for the PUCCH group. In some cases, the configuration signal includes a RRC signal.

The TPC manager 835 may receive a transmit power control command. In some examples, the TPC manager 835 may identify, based on the transmit power control command, a first power control for transmission of the first feedback message and a second power control for transmission of the second feedback message. In some examples, the TPC manager 835 may transmit power indicated by the transmit power control command is split between the first power control and the second power control in accordance with a default ratio.

In some examples, the TPC manager 835 may transmit power indicated by the transmit power control command is split between the first power control and the second power control in accordance with a configuration message received by the UE. In some examples, the TPC manager 835 may receive a first transmit power control command indicative of a first transmit power control for transmission of the first feedback message. In some examples, the TPC manager 835 may receive a second transmit power control command indicative of a second transmit power control for transmission of the second feedback message, where the first transmit power control command and the second transmit power control command are separate from each other.

The piggybacking manager 840 may identify that a first uplink data transmission is scheduled to overlap in time with one of the transmission of the first feedback message or the transmission of the second feedback message. In some examples, the piggybacking manager 840 may adhere to a feedback piggybacking rule in transmission of the first feedback message and transmission of the second feedback message, where the feedback piggybacking rule is that a supplemental feedback message is not multiplexed on a same uplink data transmission on which a primary feedback message is multiplexed. In some examples, the piggybacking manager 840 may multiplex the first feedback message with the first uplink data transmission without multiplexing the second feedback message with the first uplink data transmission. In some examples, the piggybacking manager 840 may multiplex the second feedback message with the first uplink data transmission without multiplexing the first feedback message with the first uplink data transmission.

The downlink receiving manager 845 may be configured as or otherwise support a means for receiving downlink signaling (e.g., downlink transmission) via at least one of a PCell, an SCell, or a combination thereof. The feedback indication manager 815 may be configured as or otherwise support a means for identifying one or more messages configured via the downlink signaling, a feedback indication for the downlink signaling, or both. The uplink transmitting manager 850 may be configured as or otherwise support a means for transmitting, via the PCell and based on the downlink signaling, a first uplink control channel message including a first payload. The uplink transmitting manager 850 may be configured as or otherwise support a means for transmitting, via the SCell and based on the downlink signaling, the first uplink control channel message, or both, a second uplink control channel message including a second payload different from the first payload, where the first payload or the second payload includes the feedback indication.

In some examples, the uplink transmitting manager 850 may be configured as or otherwise support a means for transmitting the first uplink control channel message via a first set of resources. In some examples, the uplink transmitting manager 850 may be configured as or otherwise support a means for transmitting the second uplink control channel message via a second set of resources, where the first set of resources and the second set of resources at least partially overlap in a time domain.

In some examples, the uplink transmitting manager 850 may be configured as or otherwise support a means for transmitting the first uplink control channel message on a first component carrier simultaneously with transmitting the second uplink control channel message on a second component carrier.

In some examples, the control signaling receiving manager 855 may be configured as or otherwise support a means for receiving first control signaling indicating a first set of resources for the first uplink control channel message, where the first uplink control channel message is transmitted within the first set of resources. In some examples, the control signaling receiving manager 855 may be configured as or otherwise support a means for receiving second control signaling different from the first control signaling, the second control signaling indicating a second set of resources for the second uplink control channel message, where the second uplink control channel message is transmitted within the second set of resources.

In some examples, the first control signaling includes a first RRC message, a first DCI message, or both. In some examples, the second control signaling includes a second RRC message, a second DCI message, or both.

In some examples, the downlink receiving manager 845 may be configured as or otherwise support a means for receiving an indication of an uplink control channel resource configuration associated with the PCell and the SCell, where the first uplink control channel message and the second uplink control channel message are transmitted in accordance with the uplink control channel resource configuration.

In some examples, the downlink receiving manager 845 may be configured as or otherwise support a means for receiving an indication of a first uplink control channel resource configuration associated with the PCell, where the first uplink control channel message is transmitted in accordance with the first uplink control channel resource configuration. In some examples, the downlink receiving manager 845 may be configured as or otherwise support a means for receiving an indication of a second uplink control channel resource configuration associated with the PCell, the second uplink control channel resource configuration different from the first uplink control channel resource configuration, where the second uplink control channel message is transmitted in accordance with the second uplink control channel resource configuration.

In some examples, the PUCCH group manager 860 may be configured as or otherwise support a means for receiving an indication of an activation of the PUCCH group on the SCell, where transmitting the second uplink control channel message is based on the activation. In some examples, the PUCCH group manager 860 may be configured as or otherwise support a means for identifying, based on the activation of the PUCCH group on the SCell, that the SCell includes a supplemental PUCCH cell configured for the SCell to receive and the UE to transmit supplemental uplink control channel messages, where transmitting the second uplink control channel message is based on identifying the SCell as a secondary PUCCH cell.

In some examples, the control signaling receiving manager 855 may be configured as or otherwise support a means for receiving first control signaling indicating a first slot offset between reception of the downlink signaling (e.g., downlink transmission) and a respective transmission resource for transmitting the first uplink control channel message, where the first uplink control channel message is transmitted in accordance with the first slot offset. In some examples, the control signaling receiving manager 855 may be configured as or otherwise support a means for receiving second control signaling indicating a second slot offset between reception of the downlink signaling and a respective transmission resource for transmitting the second uplink control channel message, where the second uplink control channel message is transmitted in accordance with the second slot offset.

In some examples, the TPC manager 835 may be configured as or otherwise support a means for receiving a first TPC command indicative of a first TPC for transmission of the first uplink control channel message, where the first uplink control channel message is transmitted in accordance with the first TPC. In some examples, the TPC manager 835 may be configured as or otherwise support a means for receiving a second TPC command indicative of a second TPC different from the first TPC for transmission of the second uplink control channel message, where the second uplink control channel message is transmitted in accordance with the second TPC.

In some examples, the first payload includes the feedback indication. In some examples, the second payload includes CSI. In some examples, the first uplink control channel message includes a first format for uplink control channel messages. In some examples, the second uplink control channel message includes a second format for uplink control channel messages different from the first format. In some examples, the first uplink control channel message includes a first quantity of symbols. In some examples, the second uplink control channel message includes a second quantity of symbols different from the first quantity of symbols.

Figure 9:
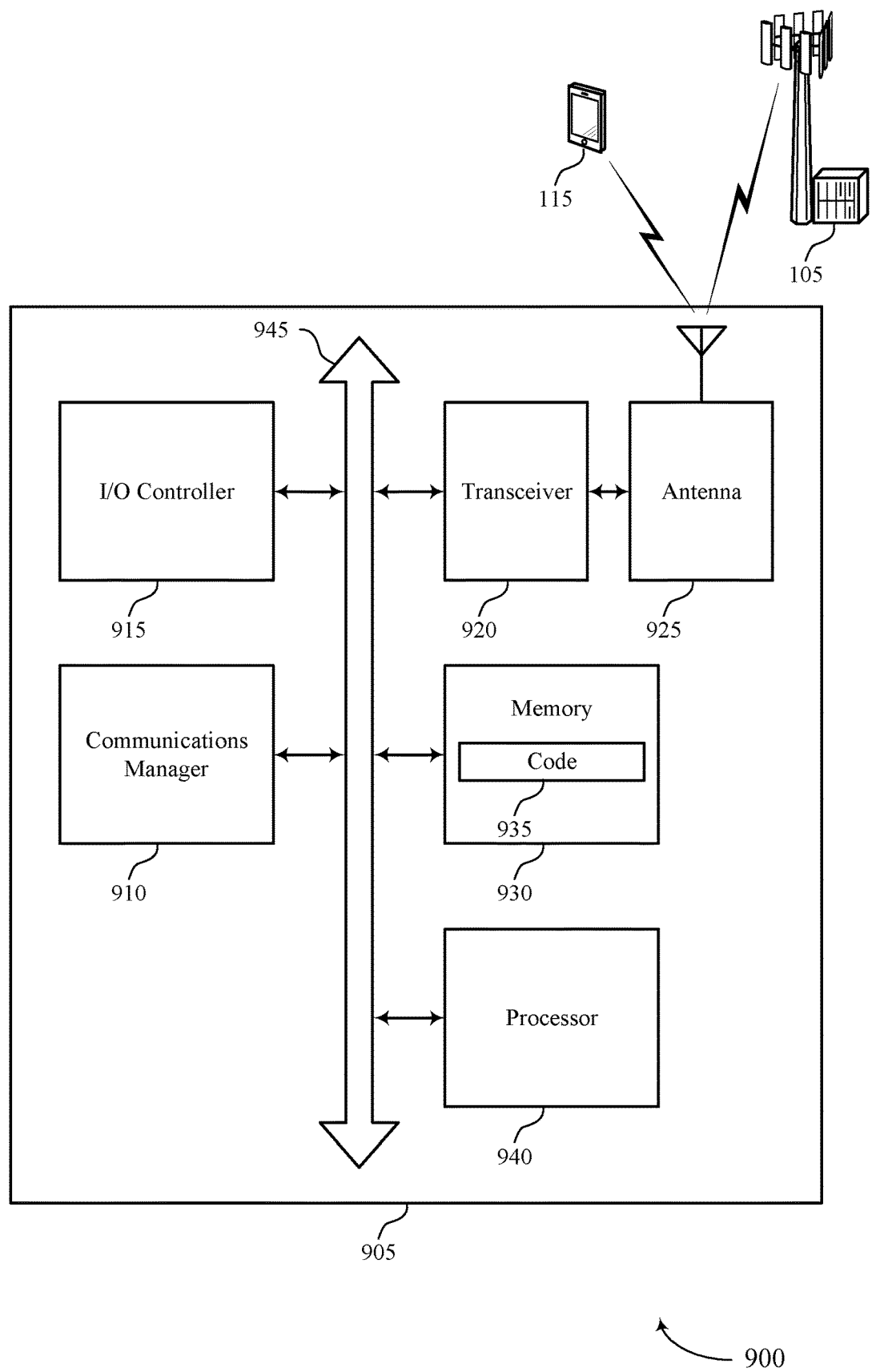
FIG. 9 shows a diagram of a system including a device that supports parallel duplicated uplink control channels in uplink carrier aggregation in accordance with aspects of the present disclosure.

FIG. 9 shows a diagram of a system 900 including a device 905 that supports parallel duplicated uplink control channels in uplink carrier aggregation in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive a downlink transmission via at least one of a PCell, a SCell, or a combination thereof, identify a feedback indication for the downlink transmission, transmit a first feedback message that includes the feedback indication via the PCell, and transmit a second feedback message that also includes the feedback indication via the SCell.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

By way of another example, the communications manager 910 may be configured as or otherwise support a means for receiving downlink signaling (e.g., downlink transmission) via at least one of a PCell, an SCell, or a combination thereof. The communications manager 910 may be configured as or otherwise support a means for identifying one or more messages configured via the downlink signaling, a feedback indication for the downlink signaling, or both. The communications manager 910 may be configured as or otherwise support a means for transmitting, via the PCell and based on the downlink signaling, a first uplink control channel message including a first payload. The communications manager 910 may be configured as or otherwise support a means for transmitting, via the SCell and based on the downlink transmission, the first uplink control channel message, or both, a second uplink control channel message including a second payload different from the first payload, where the first payload or the second payload includes the feedback indication.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting parallel duplicated uplink control channels in uplink carrier aggregation).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
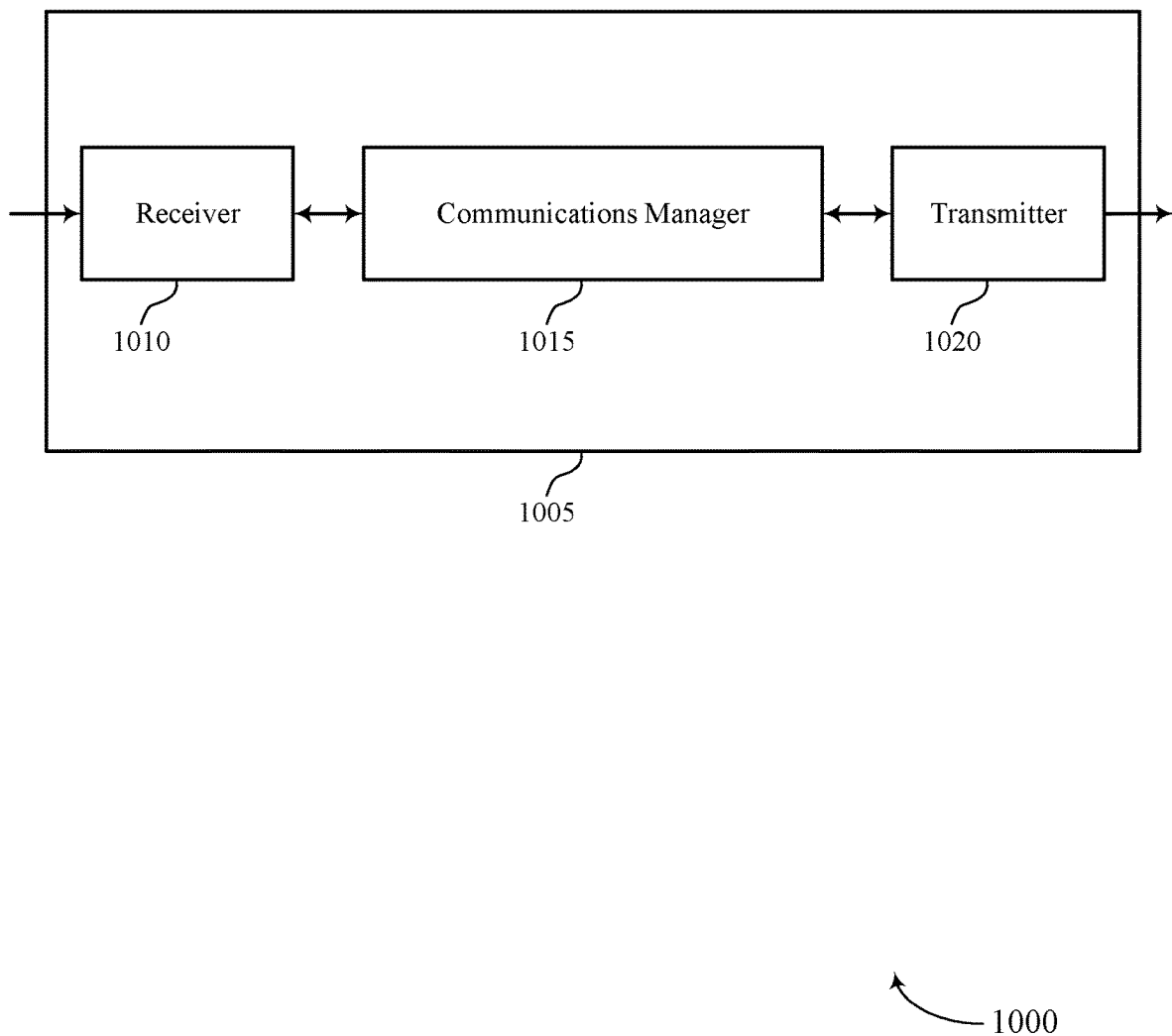
FIGS. 10 and 11 show block diagrams of devices that support parallel duplicated uplink control channels in uplink carrier aggregation in accordance with aspects of the present disclosure.

FIG. 10 shows a block diagram 1000 of a device 1005 that supports parallel duplicated uplink control channels in uplink carrier aggregation in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to parallel duplicated uplink control channels in uplink carrier aggregation, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit a downlink transmission to a UE via at least one of a PCell, a SCell, or a combination thereof, receive, via the PCell, a first feedback message that includes a feedback indication for the downlink transmission, and receive, via the SCell, a second feedback message from the UE that also includes the feedback indication for the downlink transmission. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 32. The transmitter 1020 may utilize a single antenna or a set of antennas.

The communications manager 1015 may be configured as or otherwise support a means for transmitting, to a UE, downlink signaling (e.g., downlink transmission) via at least one of a PCell, an SCell, or a combination thereof. The communications manager 1015 may be configured as or otherwise support a means for receiving, via the PCell and based on the downlink signaling, a first uplink control channel message including a first payload. The communications manager 1015 may be configured as or otherwise support a means for receiving, via the SCell and based on the downlink signaling, the first uplink control channel message, or both, a second uplink control channel message including a second payload different from the first payload, where the first payload or the second payload includes a feedback indication for the downlink signaling.

Figure 11:
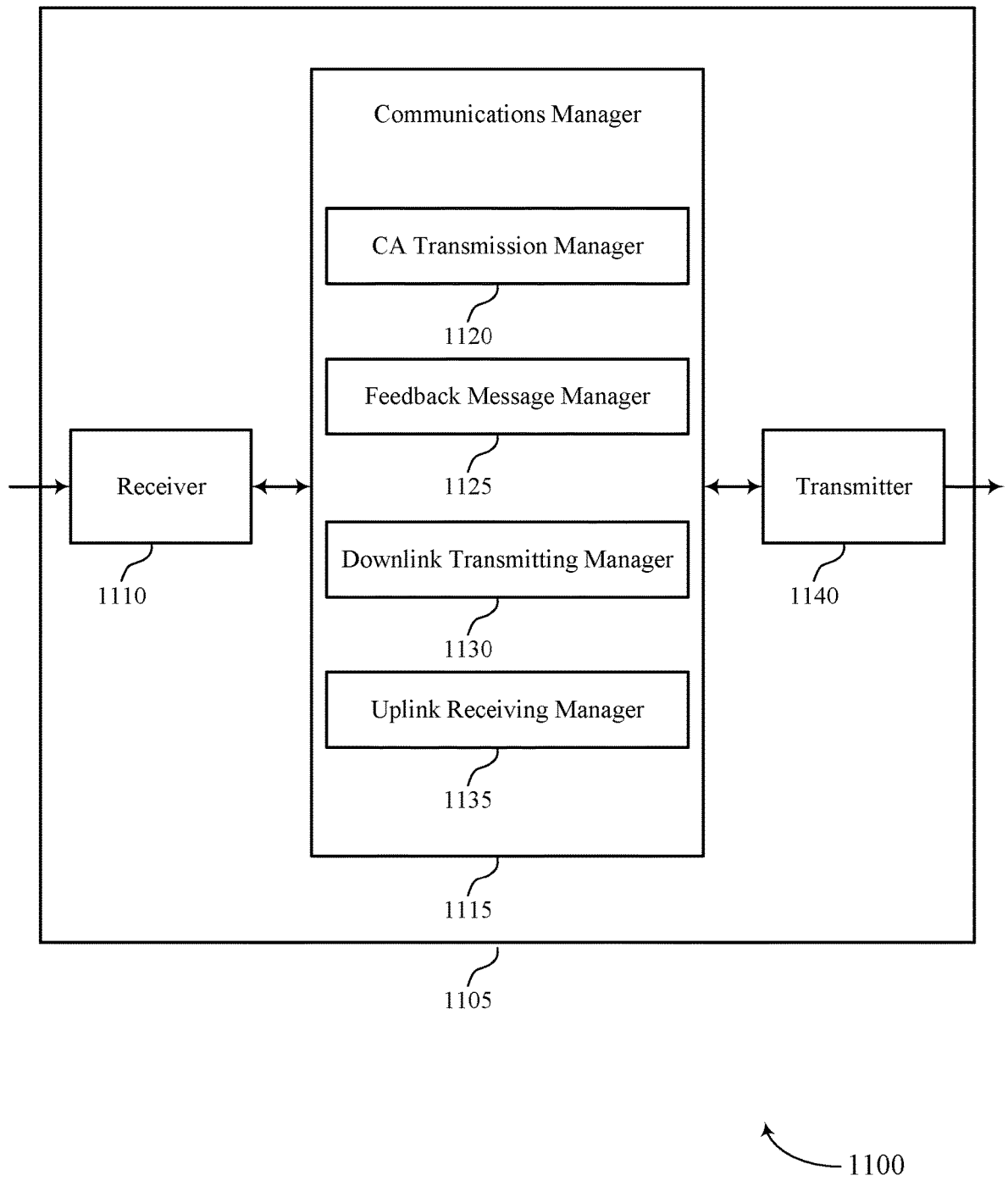

FIG. 11 shows a block diagram 1100 of a device 1105 that supports parallel duplicated uplink control channels in uplink carrier aggregation in accordance with aspects of the present disclosure. The device 1105 may be an example of aspects of a device 905, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to parallel duplicated uplink control channels in uplink carrier aggregation, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a CA transmission manager 1120 and a feedback message manager 1125. The communications manager 1115 may be an example of aspects of the communications manager 1310 described herein.

The CA transmission manager 1120 may transmit a downlink transmission to a UE via at least one of a PCell, a SCell, or a combination thereof.

The feedback message manager 1125 may receive, via the PCell, a first feedback message that includes a feedback indication for the downlink transmission and receive, via the SCell, a second feedback message from the UE that also includes the feedback indication for the downlink transmission.

The downlink transmitting manager 1130 may be configured as or otherwise support a means for transmitting, to a UE, downlink signaling (e.g., downlink transmission) via at least one of a PCell, an SCell, or a combination thereof. The uplink receiving manager 1135 may be configured as or otherwise support a means for receiving, via the PCell and based on the downlink signaling, a first uplink control channel message including a first payload. The uplink receiving manager 1135 may be configured as or otherwise support a means for receiving, via the SCell and based on the downlink signaling, the first uplink control channel message, or both, a second uplink control channel message including a second payload different from the first payload, where the first payload or the second payload includes a feedback indication for the downlink signaling.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
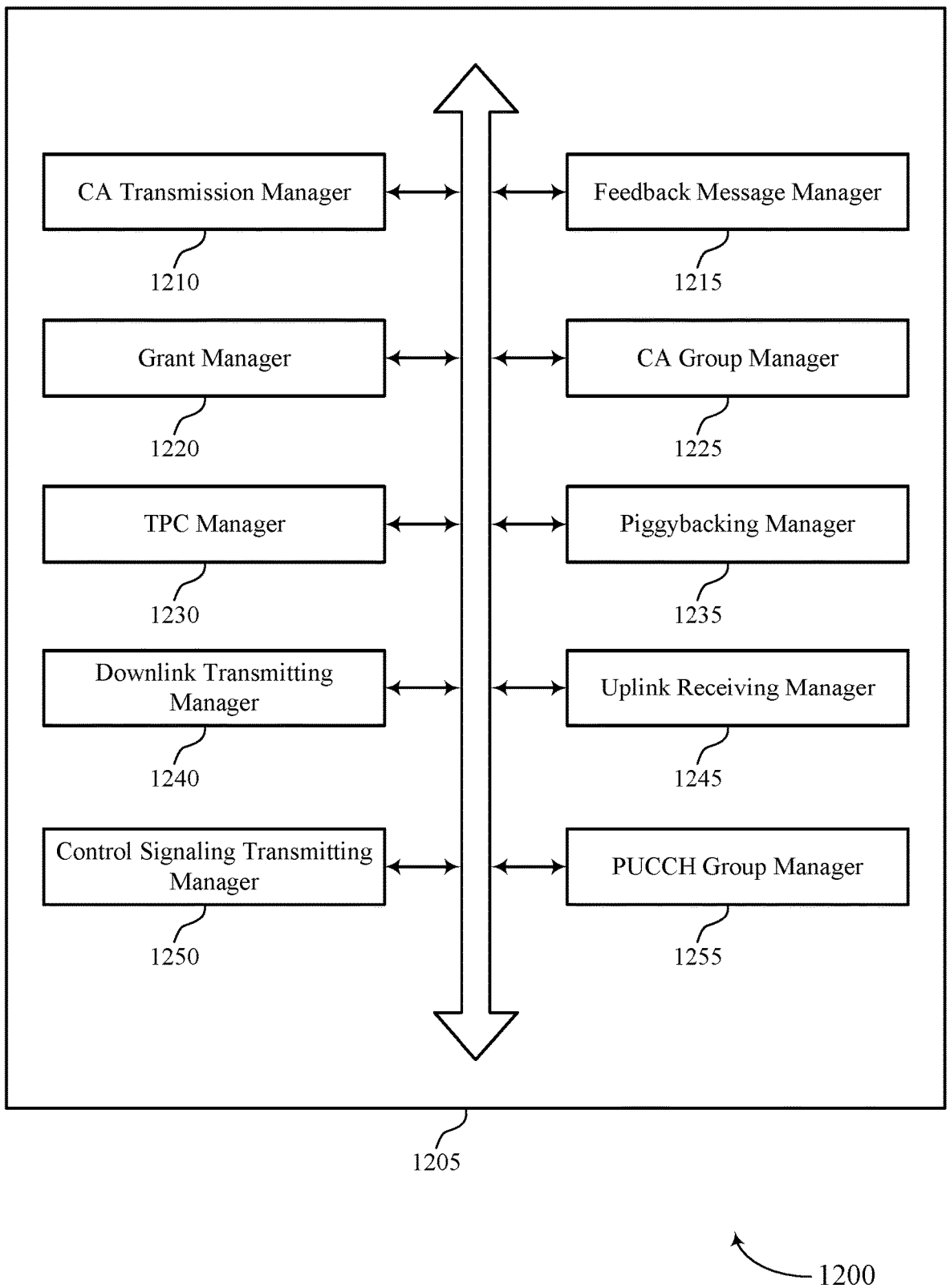
FIG. 12 shows a block diagram of a communications manager that supports parallel duplicated uplink control channels in uplink carrier aggregation in accordance with aspects of the present disclosure.

FIG. 12 shows a block diagram 1200 of a communications manager 1205 that supports parallel duplicated uplink control channels in uplink carrier aggregation in accordance with aspects of the present disclosure. The communications manager 1205 may be an example of aspects of a communications manager 1015, a communications manager 1115, or a communications manager 1310 described herein. The communications manager 1205 may include a CA transmission manager 1210, a feedback message manager 1215, a grant manager 1220, a CA group manager 1225, a TPC manager 1230, a piggybacking manager 1235, a downlink transmitting manager 1240, an uplink receiving manager 1245, a control signaling transmitting manager 1250, and a PUCCH group manager 1255. Each of these modules may communicate, directly or indirectly, with one another (e.g., via one or more buses).

The CA transmission manager 1210 may transmit a downlink transmission to a UE via at least one of a PCell, a SCell, or a combination thereof.

The feedback message manager 1215 may receive, via the PCell, a first feedback message that includes a feedback indication for the downlink transmission. In some examples, the feedback message manager 1215 may receive, via the SCell, a second feedback message from the UE that also includes the feedback indication for the downlink transmission. In some examples, the feedback message manager 1215 may receive the first feedback message on a first component carrier simultaneously with receiving the second feedback message on a second component carrier, wherein a first resource indication for the first feedback message is the same as or different than a second resource indication for the second feedback message. In some examples, the feedback message manager 1215 may receive the first feedback message on a first component carrier before receiving the second feedback message on a second component carrier, wherein a first resource indication for the first feedback message is the same as or different than a second resource indication for the second feedback message The grant manager 1220 may transmit a grant scheduling the downlink transmission to the UE, the grant indicating that multi-cell uplink feedback message transmission is enabled for the downlink transmission. In some examples, the grant manager 1220 may configure the grant to indicate a first resource indication for transmission of the first feedback message and a second resource indication for transmission of the second feedback message, where the first resource indication and second resource indication are jointly indicated within the grant as a same resource indication.

In some examples, the grant manager 1220 may configure the grant to indicate a first resource indication for transmission of the first feedback message and a second resource indication for transmission of the second feedback message, where the first resource indication and second resource indication are independently indicated within the grant as separate resource indications. In some examples, the grant manager 1220 may configure the grant to indicate a first resource for transmission of the first feedback message and a second resource for transmission of the second feedback message, where the first resource and the second resource are both for feedback message transmission within a same transmission time interval.

In some examples, the grant manager 1220 may configure the grant to indicate a first resource for transmission of the first feedback message and a second resource for transmission of the second feedback message, where the first resource and the second resource are for feedback message transmission within different transmission time intervals. In some cases, the grant includes a one-bit field to enable or disable the multi-cell uplink feedback message transmission. In some cases, the same resource indication includes at least a slot offset for reception of the feedback indication relative to transmission of the downlink transmission and a transmission resource for transmission of the feedback indication from the UE. In some cases, the first resource indication and the second resource indication each include at least a slot offset for reception of the feedback indication relative to transmission of the downlink transmission and a respective transmission resource for transmission of the feedback indication from the UE. In some cases, the same transmission time interval is a one-symbol feedback transmission time interval.

The CA group manager 1225 may transmit a configuration signal configuring a PUCCH group that includes the PCell and the SCell, where the configuration signal indicates that the SCell is a supplemental PUCCH cell configured for the SCell to receive and the UE to transmit duplicate feedback for the PUCCH group. In some cases, the configuration signal includes a RRC signal.

The TPC manager 1230 may transmit a transmit power control command that indicates a first power control for transmission of the first feedback message and a second power control for transmission of the second feedback message. In some examples, the TPC manager 1230 may transmit power indicated by the transmit power control command is split between the first power control and the second power control in accordance with a default ratio. In some examples, the TPC manager 1230 may transmit power indicated by the transmit power control command is split between the first power control and the second power control in accordance with a configuration message transmitted to the UE.

In some examples, the TPC manager 1230 may transmit a first transmit power control command indicative of a first transmit power control for transmission of the first feedback message. In some examples, the TPC manager 1230 may transmit a second transmit power control command indicative of a second transmit power control for transmission of the second feedback message, where the first transmit power control command and the second transmit power control command are separate from each other.

The piggybacking manager 1235 may receive a first uplink data transmission from the UE, where one of the first feedback message or the second feedback message is received multiplexed with the first uplink data transmission, and where another of the first feedback message or the second feedback message is received separate from the first uplink data transmission.

The downlink transmitting manager 1240 may be configured as or otherwise support a means for transmitting, to a UE, downlink signaling (e.g., downlink transmission) via at least one of a PCell, an SCell, or a combination thereof. The uplink receiving manager 1245 may be configured as or otherwise support a means for receiving, via the PCell and based on the downlink signaling, a first uplink control channel message including a first payload. In some examples, the uplink receiving manager 1245 may be configured as or otherwise support a means for receiving, via the SCell and based on the downlink signaling, the first uplink control channel message, or both, a second uplink control channel message including a second payload different from the first payload, where the first payload or the second payload includes a feedback indication for the downlink signaling.

In some examples, the uplink receiving manager 1245 may be configured as or otherwise support a means for receiving the first uplink control channel message via a first set of resources. In some examples, the uplink receiving manager 1245 may be configured as or otherwise support a means for receiving the second uplink control channel message via a second set of resources, where the first set of resources and the second set of resources at least partially overlap in a time domain.

In some examples, the uplink receiving manager 1245 may be configured as or otherwise support a means for receiving the first uplink control channel message on a first component carrier simultaneously with receiving the second uplink control channel message on a second component carrier.

In some examples, the control signaling transmitting manager 1250 may be configured as or otherwise support a means for transmitting first control signaling indicating a first set of resources for the first uplink control channel message, where the first uplink control channel message is received within the first set of resources. In some examples, the control signaling transmitting manager 1250 may be configured as or otherwise support a means for transmitting second control signaling different from the first control signaling, the second control signaling indicating a second set of resources for the second uplink control channel message, where the second uplink control channel message is received within the second set of resources.

In some examples, the first control signaling includes a first RRC message, a first DCI message, or both. In some examples, the second control signaling includes a second RRC message, a second DCI message, or both.

In some examples, the downlink transmitting manager 1240 may be configured as or otherwise support a means for transmitting an indication of an uplink control channel resource configuration associated with the PCell and the SCell, where the first uplink control channel message and the second uplink control channel message are received in accordance with the uplink control channel resource configuration.

In some examples, the downlink transmitting manager 1240 may be configured as or otherwise support a means for transmitting an indication of a first uplink control channel resource configuration associated with the PCell, where the first uplink control channel message is received in accordance with the first uplink control channel resource configuration. In some examples, the downlink transmitting manager 1240 may be configured as or otherwise support a means for transmitting an indication of a second uplink control channel resource configuration associated with the PCell, the second uplink control channel resource configuration different from the first uplink control channel resource configuration, where the second uplink control channel message is received in accordance with the second uplink control channel resource configuration.

In some examples, the PUCCH group manager 1255 may be configured as or otherwise support a means for transmitting an indication of an activation of the PUCCH group on the SCell, where receiving the second uplink control channel message is based on the activation.

In some examples, the PUCCH group manager 1255 may be configured as or otherwise support a means for identifying, based on the activation of the PUCCH group on the SCell, that the SCell includes a supplemental PUCCH cell configured for the SCell to receive and the UE to transmit supplemental uplink control channel messages, where receiving the second uplink control channel message is based on identifying the SCell as a secondary PUCCH cell.

In some examples, the control signaling transmitting manager 1250 may be configured as or otherwise support a means for transmitting first control signaling indicating a first slot offset between reception of the downlink signaling (e.g., downlink transmission) and a respective transmission resource for transmitting the first uplink control channel message, where the first uplink control channel message is received in accordance with the first slot offset. In some examples, the control signaling transmitting manager 1250 may be configured as or otherwise support a means for transmitting second control signaling indicating a second slot offset between reception of the downlink signaling (e.g., downlink transmission) and a respective transmission resource for transmitting the second uplink control channel message, where the second uplink control channel message is received in accordance with the second slot offset.

In some examples, the TPC manager 1230 may be configured as or otherwise support a means for transmitting a first TPC command indicative of a first TPC for transmission of the first uplink control channel message, where the first uplink control channel message is received in accordance with the first TPC. In some examples, the TPC manager 1230 may be configured as or otherwise support a means for transmitting a second TPC command indicative of a second TPC different from the first TPC for transmission of the second uplink control channel message, where the second uplink control channel message is received in accordance with the second TPC.

In some examples, the first payload includes the feedback indication. In some examples, the second payload includes CSI. In some examples, the first uplink control channel message includes a first format for uplink control channel messages. In some examples, the second uplink control channel message includes a second format for uplink control channel messages different from the first format. In some examples, the first uplink control channel message includes a first quantity of symbols. In some examples, the second uplink control channel message includes a second quantity of symbols different from the first quantity of symbols.

Figure 13:
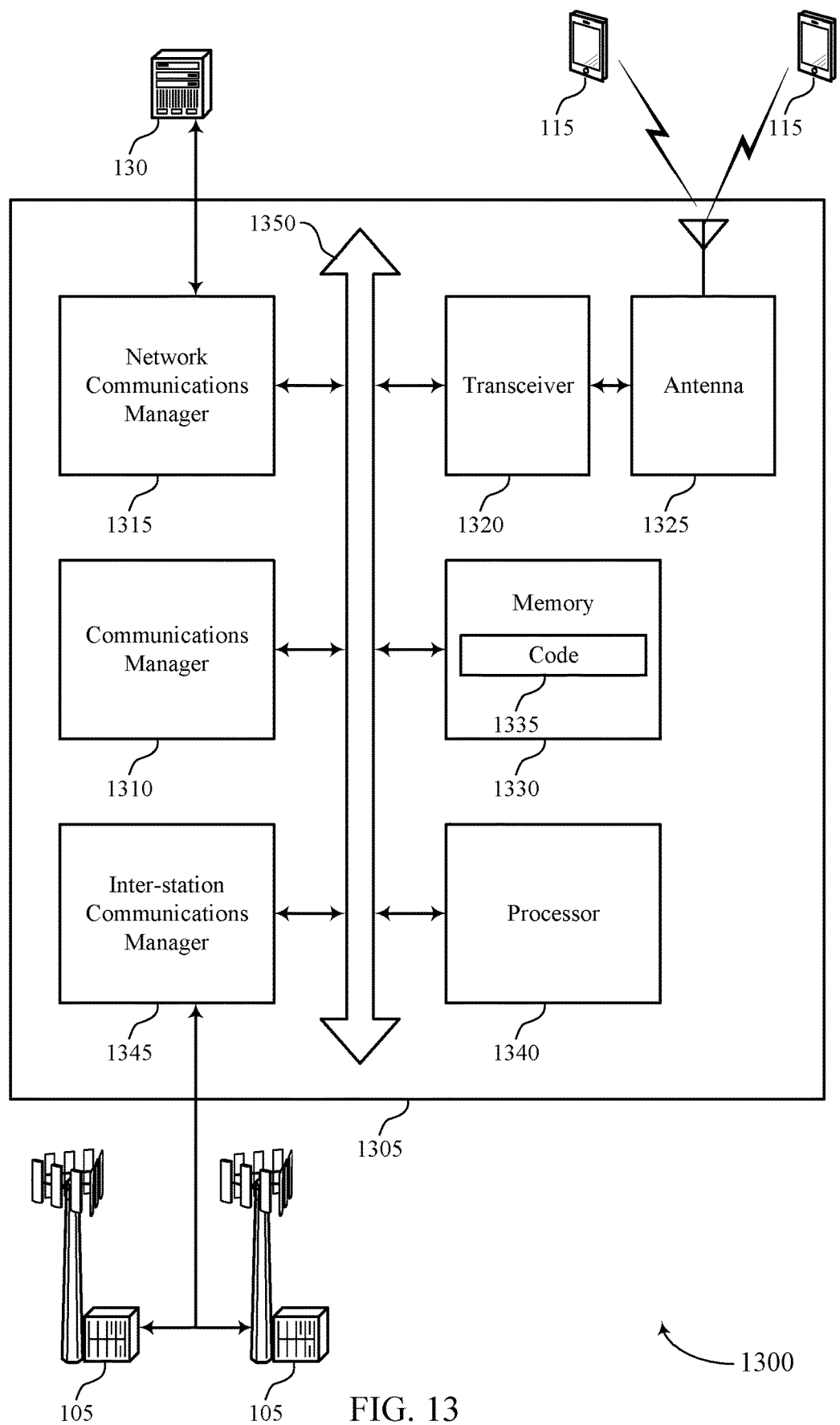
FIG. 13 shows a diagram of a system including a device that supports parallel duplicated uplink control channels in uplink carrier aggregation in accordance with aspects of the present disclosure.

FIG. 13 shows a diagram of a system 1300 including a device 1305 that supports parallel duplicated uplink control channels in uplink carrier aggregation in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, a memory 1330, a processor 1340, and an inter-station communications manager 1345. These components may be in electronic communication via one or more buses (e.g., bus 1350).

The communications manager 1310 may transmit a downlink transmission to a UE via at least one of a PCell, a SCell, or a combination thereof, receive, via the PCell, a first feedback message that includes a feedback indication for the downlink transmission, and receive, via the SCell, a second feedback message from the UE that also includes the feedback indication for the downlink transmission.

By way of another example, the communications manager 1310 may be configured as or otherwise support a means for transmitting, to a UE, downlink signaling (e.g., downlink transmission) via at least one of a PCell, an SCell, or a combination thereof. The communications manager 1310 may be configured as or otherwise support a means for receiving, via the PCell and based on the downlink signaling, a first uplink control channel message including a first payload. The communications manager 1310 may be configured as or otherwise support a means for receiving, via the SCell and based on the downlink signaling, the first uplink control channel message, or both, a second uplink control channel message including a second payload different from the first payload, where the first payload or the second payload includes a feedback indication for the downlink signaling.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting parallel duplicated uplink control channels in uplink carrier aggregation).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
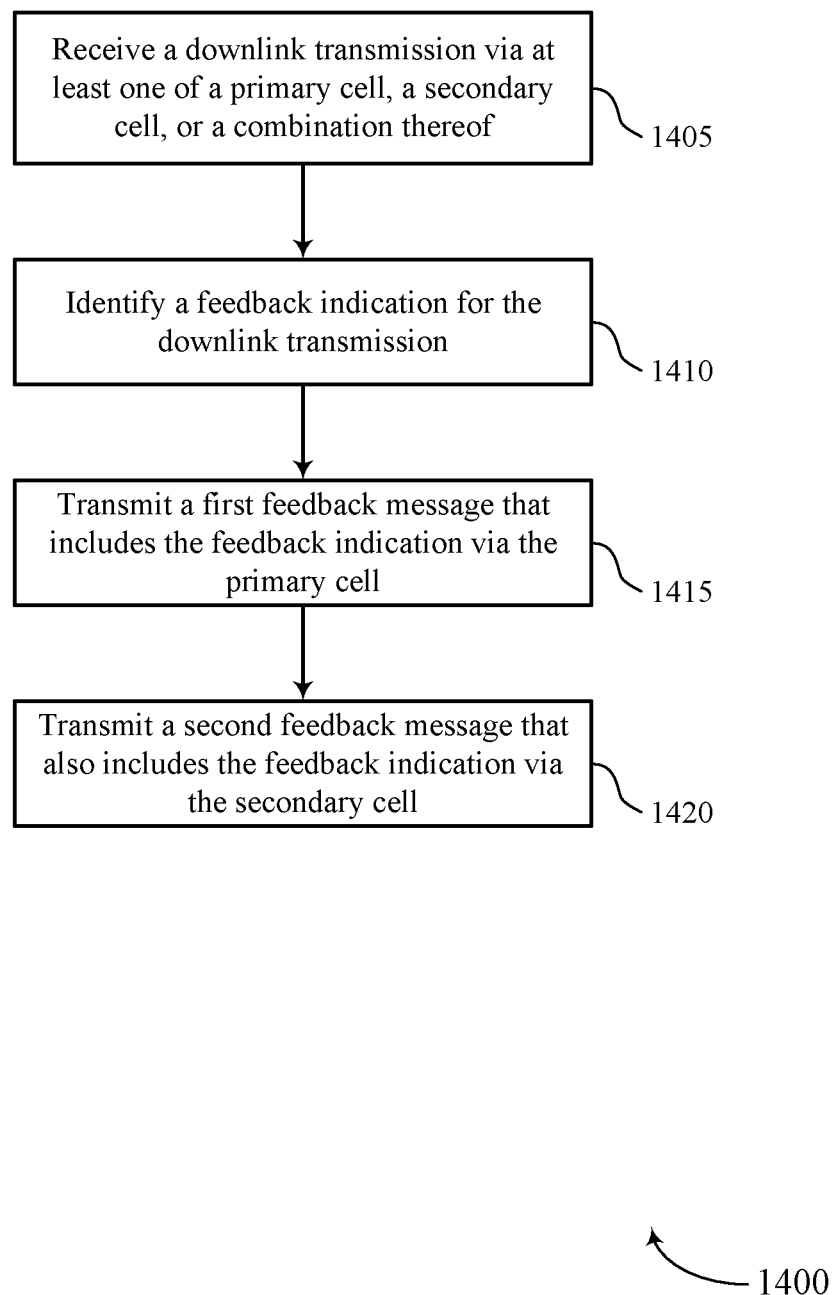
FIGS. 14 through 20 show flowcharts illustrating methods that support parallel uplink control channels in uplink carrier aggregation in accordance with aspects of the present disclosure.

FIG. 14 shows a flowchart illustrating a method 1400 that supports parallel duplicated uplink control channels in uplink carrier aggregation in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive a downlink transmission via at least one of a PCell, a SCell, or a combination thereof. The operations of 1405 may be performed according to the methods described herein. In some examples, aspects of the operations of 1405 may be performed by a CA transmission manager as described with reference to FIGS. 6 through 9.

At 1410, the UE may identify a feedback indication for the downlink transmission. The operations of 1410 may be performed according to the methods described herein. In some examples, aspects of the operations of 1410 may be performed by a feedback indication manager as described with reference to FIGS. 6 through 9.

At 1415, the UE may transmit a first feedback message that includes the feedback indication via the PCell. The operations of 1415 may be performed according to the methods described herein. In some examples, aspects of the operations of 1415 may be performed by a feedback message manager as described with reference to FIGS. 6 through 9.

At 1420, the UE may transmit a second feedback message that also includes the feedback indication via the SCell. The operations of 1420 may be performed according to the methods described herein. In some examples, aspects of the operations of 1420 may be performed by a feedback message manager as described with reference to FIGS. 6 through 9.

Figure 15:
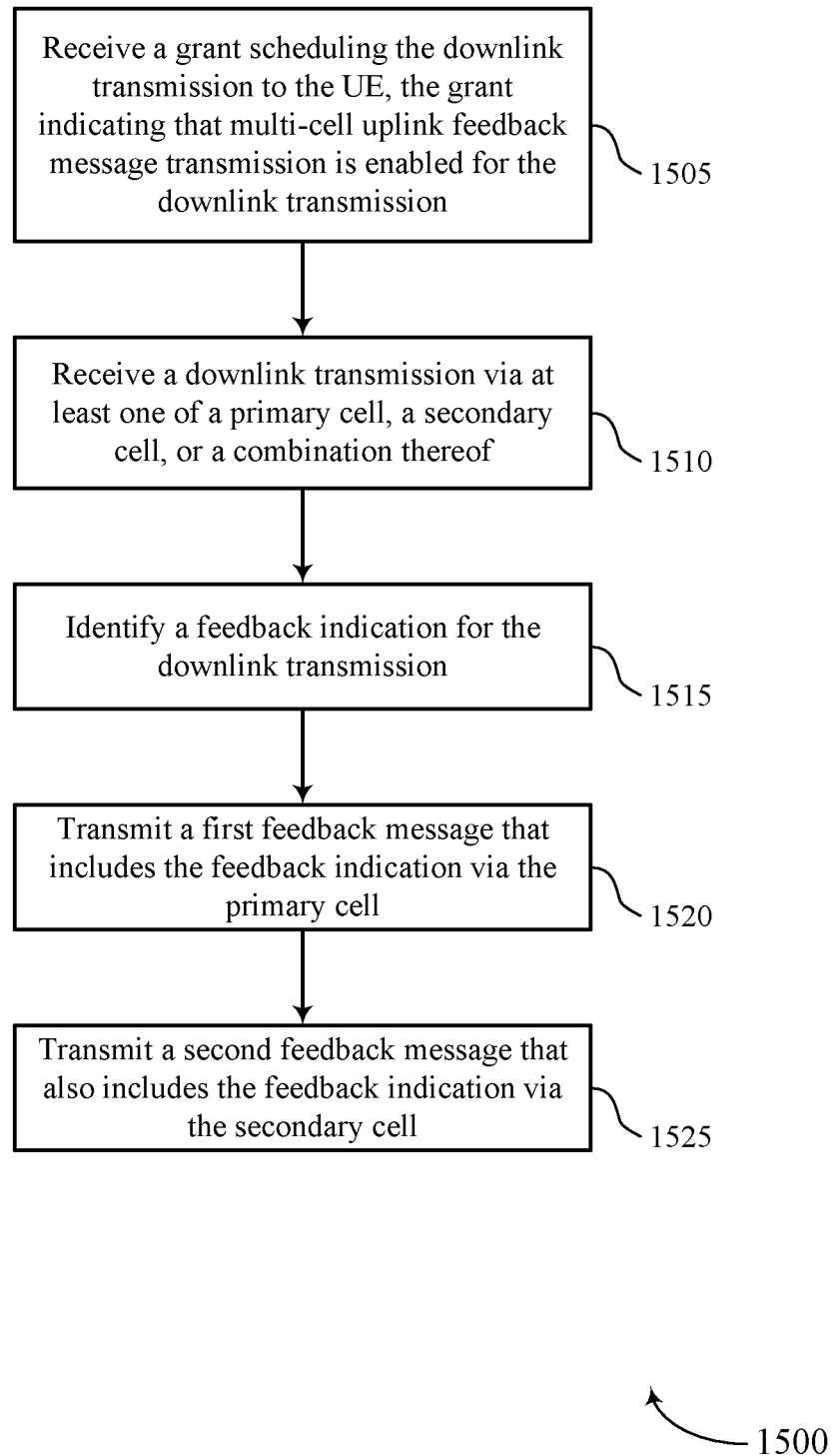

FIG. 15 shows a flowchart illustrating a method 1500 that supports parallel duplicated uplink control channels in uplink carrier aggregation in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive a grant scheduling the downlink transmission to the UE, the grant indicating that multi-cell uplink feedback message transmission is enabled for the downlink transmission. The operations of 1505 may be performed according to the methods described herein. In some examples, aspects of the operations of 1505 may be performed by a grant manager as described with reference to FIGS. 6 through 9.

At 1510, the UE may receive a downlink transmission via at least one of a PCell, a SCell, or a combination thereof. The operations of 1510 may be performed according to the methods described herein. In some examples, aspects of the operations of 1510 may be performed by a CA transmission manager as described with reference to FIGS. 6 through 9.

At 1515, the UE may identify a feedback indication for the downlink transmission. The operations of 1515 may be performed according to the methods described herein. In some examples, aspects of the operations of 1515 may be performed by a feedback indication manager as described with reference to FIGS. 6 through 9.

At 1520, the UE may transmit a first feedback message that includes the feedback indication via the PCell. The operations of 1520 may be performed according to the methods described herein. In some examples, aspects of the operations of 1520 may be performed by a feedback message manager as described with reference to FIGS. 6 through 9.

At 1525, the UE may transmit a second feedback message that also includes the feedback indication via the SCell. The operations of 1525 may be performed according to the methods described herein. In some examples, aspects of the operations of 1525 may be performed by a feedback message manager as described with reference to FIGS. 6 through 9.

Figure 16:
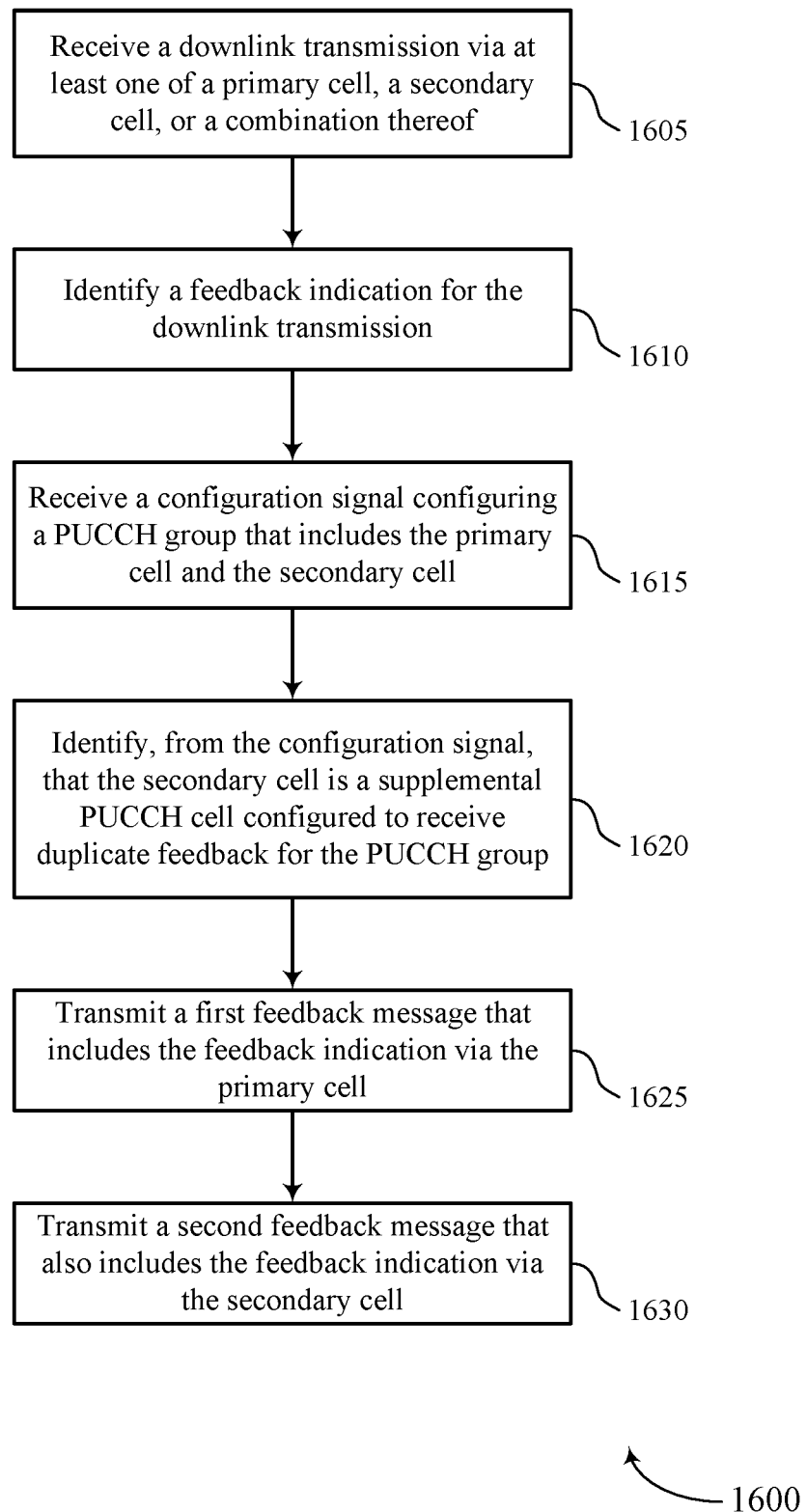

FIG. 16 shows a flowchart illustrating a method 1600 that supports parallel duplicated uplink control channels in uplink carrier aggregation in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive a downlink transmission via at least one of a PCell, a SCell, or a combination thereof. The operations of 1605 may be performed according to the methods described herein. In some examples, aspects of the operations of 1605 may be performed by a CA transmission manager as described with reference to FIGS. 6 through 9.

At 1610, the UE may identify a feedback indication for the downlink transmission. The operations of 1610 may be performed according to the methods described herein. In some examples, aspects of the operations of 1610 may be performed by a feedback indication manager as described with reference to FIGS. 6 through 9.

At 1615, the UE may receive a configuration signal configuring a PUCCH group that includes the PCell and the SCell. The operations of 1615 may be performed according to the methods described herein. In some examples, aspects of the operations of 1615 may be performed by a CA group manager as described with reference to FIGS. 6 through 9.

At 1620, the UE may identify, from the configuration signal, that the SCell is a supplemental PUCCH cell configured for the SCell to receive and the UE to transmit duplicate feedback for the PUCCH group. The operations of 1620 may be performed according to the methods described herein. In some examples, aspects of the operations of 1620 may be performed by a CA group manager as described with reference to FIGS. 6 through 9.

At 1625, the UE may transmit a first feedback message that includes the feedback indication via the PCell. The operations of 1625 may be performed according to the methods described herein. In some examples, aspects of the operations of 1625 may be performed by a feedback message manager as described with reference to FIGS. 6 through 9.

At 1630, the UE may transmit a second feedback message that also includes the feedback indication via the SCell. The operations of 1630 may be performed according to the methods described herein. In some examples, aspects of the operations of 1630 may be performed by a feedback message manager as described with reference to FIGS. 6 through 9.

Figure 17:
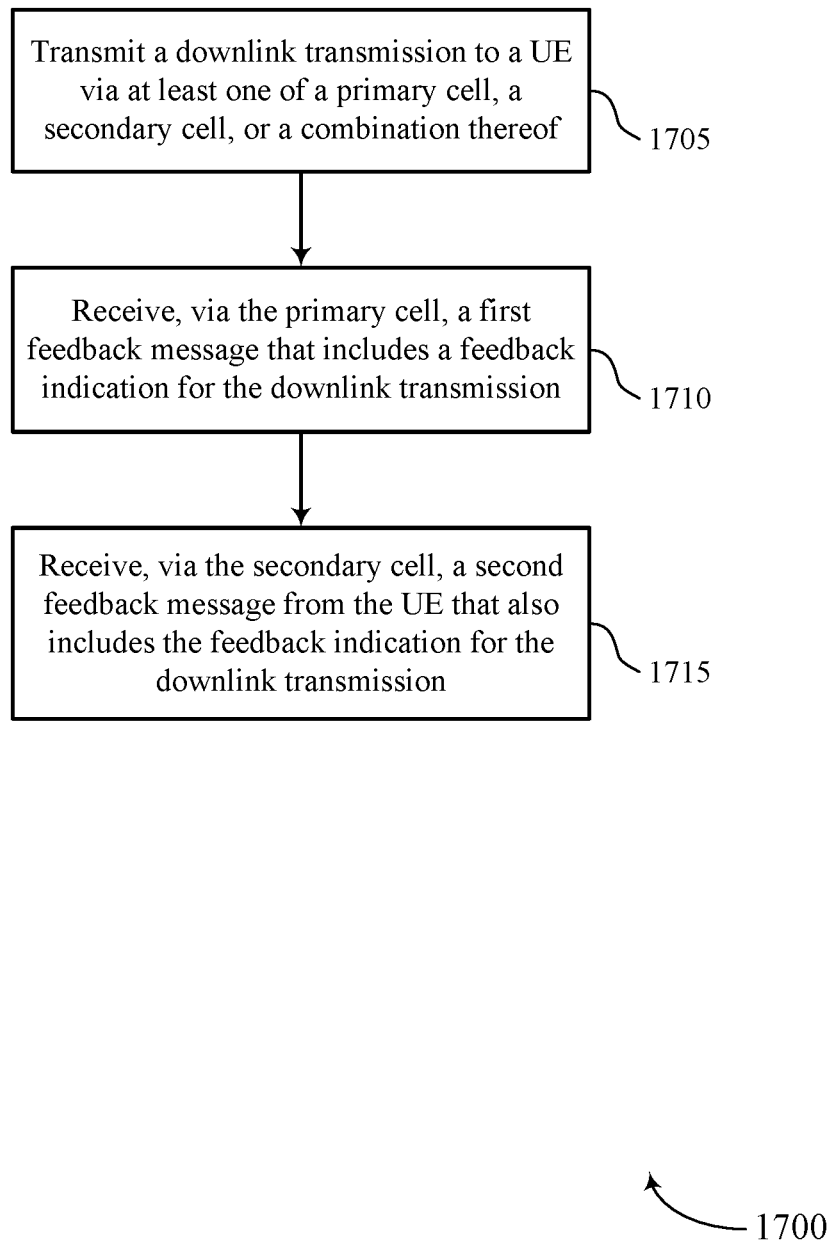

FIG. 17 shows a flowchart illustrating a method 1700 that supports parallel duplicated uplink control channels in uplink carrier aggregation in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may transmit a downlink transmission to a UE via at least one of a PCell, a SCell, or a combination thereof. The operations of 1705 may be performed according to the methods described herein. In some examples, aspects of the operations of 1705 may be performed by a CA transmission manager as described with reference to FIGS. 10 through 13.

At 1710, the base station may receive, via the PCell, a first feedback message that includes a feedback indication for the downlink transmission. The operations of 1710 may be performed according to the methods described herein. In some examples, aspects of the operations of 1710 may be performed by a feedback message manager as described with reference to FIGS. 10 through 13.

At 1715, the base station may receive, via the SCell, a second feedback message from the UE that also includes the feedback indication for the downlink transmission. The operations of 1715 may be performed according to the methods described herein. In some examples, aspects of the operations of 1715 may be performed by a feedback message manager as described with reference to FIGS. 10 through 13.

Figure 18:
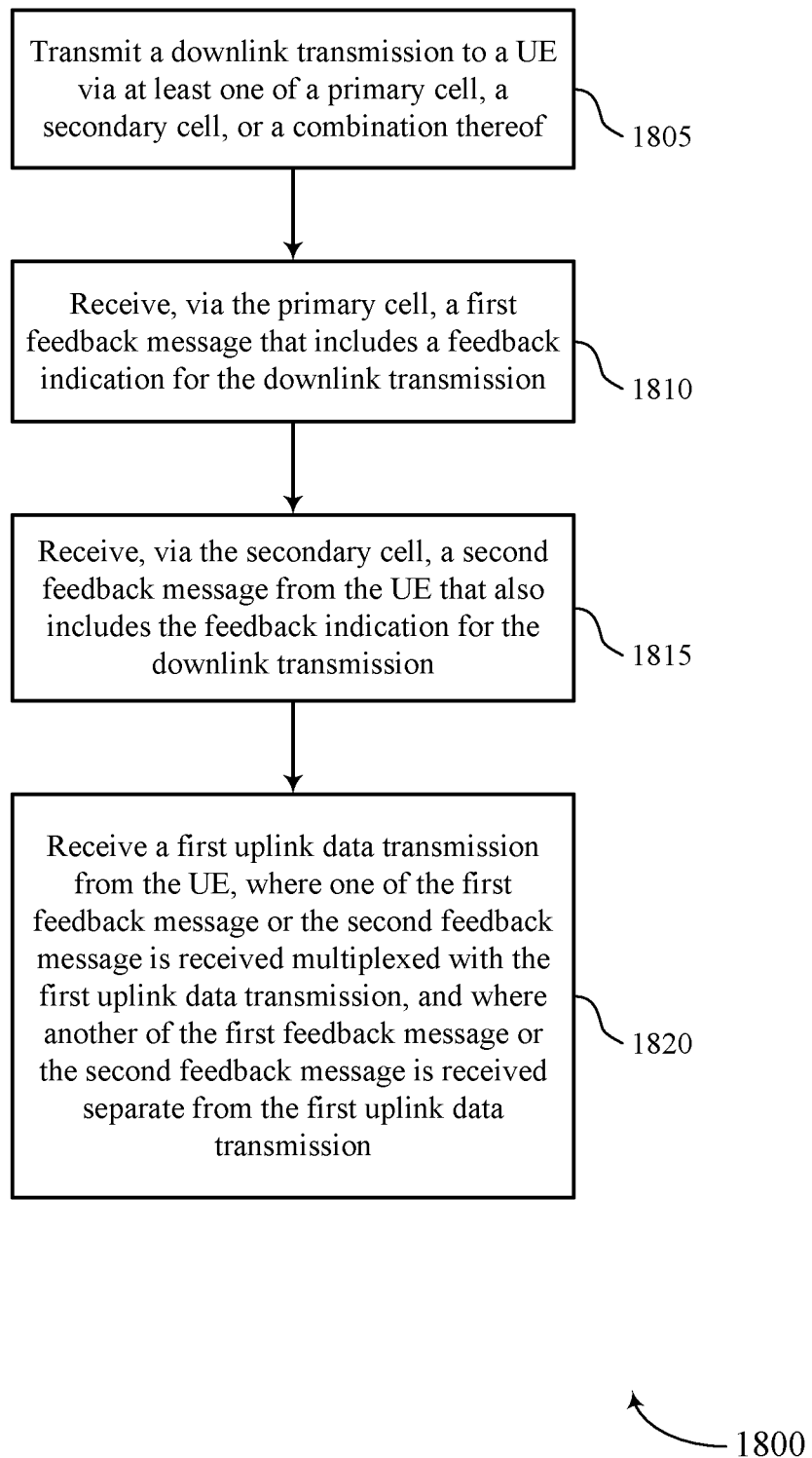

FIG. 18 shows a flowchart illustrating a method 1800 that supports parallel duplicated uplink control channels in uplink carrier aggregation in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may transmit a downlink transmission to a UE via at least one of a PCell, a SCell, or a combination thereof. The operations of 1805 may be performed according to the methods described herein. In some examples, aspects of the operations of 1805 may be performed by a CA transmission manager as described with reference to FIGS. 10 through 13.

At 1810, the base station may receive, via the PCell, a first feedback message that includes a feedback indication for the downlink transmission. The operations of 1810 may be performed according to the methods described herein. In some examples, aspects of the operations of 1810 may be performed by a feedback message manager as described with reference to FIGS. 10 through 13.

At 1815, the base station may receive, via the SCell, a second feedback message from the UE that also includes the feedback indication for the downlink transmission. The operations of 1815 may be performed according to the methods described herein. In some examples, aspects of the operations of 1815 may be performed by a feedback message manager as described with reference to FIGS. 10 through 13.

At 1820, the base station may receive a first uplink data transmission from the UE, where one of the first feedback message or the second feedback message is received multiplexed with the first uplink data transmission, and where another of the first feedback message or the second feedback message is received separate from the first uplink data transmission. The operations of 1820 may be performed according to the methods described herein. In some examples, aspects of the operations of 1820 may be performed by a piggybacking manager as described with reference to FIGS. 10 through 13.

Figure 19:
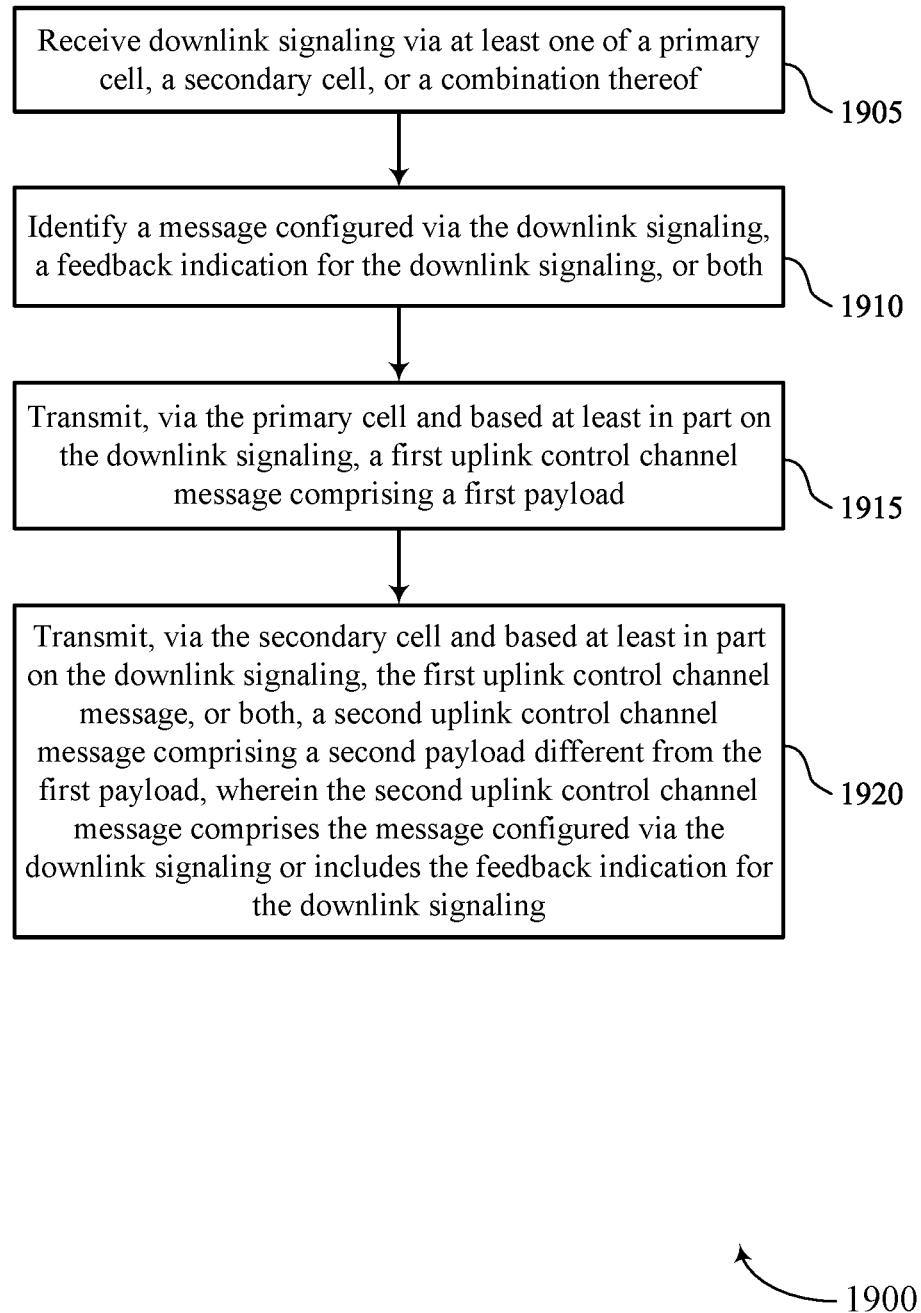

FIG. 19 shows a flowchart illustrating a method 1900 that supports parallel duplicated uplink control channels in uplink carrier aggregation in accordance with aspects of the present disclosure. The operations of the method 1900 may be implemented by a UE or its components as described herein. For example, the operations of the method 1900 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1905, the method may include receiving downlink signaling (e.g., downlink transmission) via at least one of a primary cell, a secondary cell, or a combination thereof. The operations of 1905 may be performed in accordance with examples as disclosed herein. In some examples, aspects of the operations of 1905 may be performed by a downlink receiving manager 845 as described with reference to FIG. 8.

At 1910, the method may include identifying a message configured via the downlink signaling, a feedback indication for the downlink signaling, or both. The operations of 1910 may be performed in accordance with examples as disclosed herein. In some examples, aspects of the operations of 1910 may be performed by a feedback indication manager 815 as described with reference to FIG. 8.

At 1915, the method may include transmitting, via the primary cell and based on the downlink signaling, a first uplink control channel message including a first payload. The operations of 1915 may be performed in accordance with examples as disclosed herein. In some examples, aspects of the operations of 1915 may be performed by an uplink transmitting manager 850 as described with reference to FIG. 8.

At 1920, the method may include transmitting, via the secondary cell and based on the downlink signaling, the first uplink control channel message, or both, a second uplink control channel message including a second payload different from the first payload, where the second uplink control channel message includes the message configured via the downlink signaling or includes the feedback indication for the downlink signaling. The operations of 1920 may be performed in accordance with examples as disclosed herein. In some examples, aspects of the operations of 1920 may be performed by the uplink transmitting manager 850 as described with reference to FIG. 8.

Figure 20:
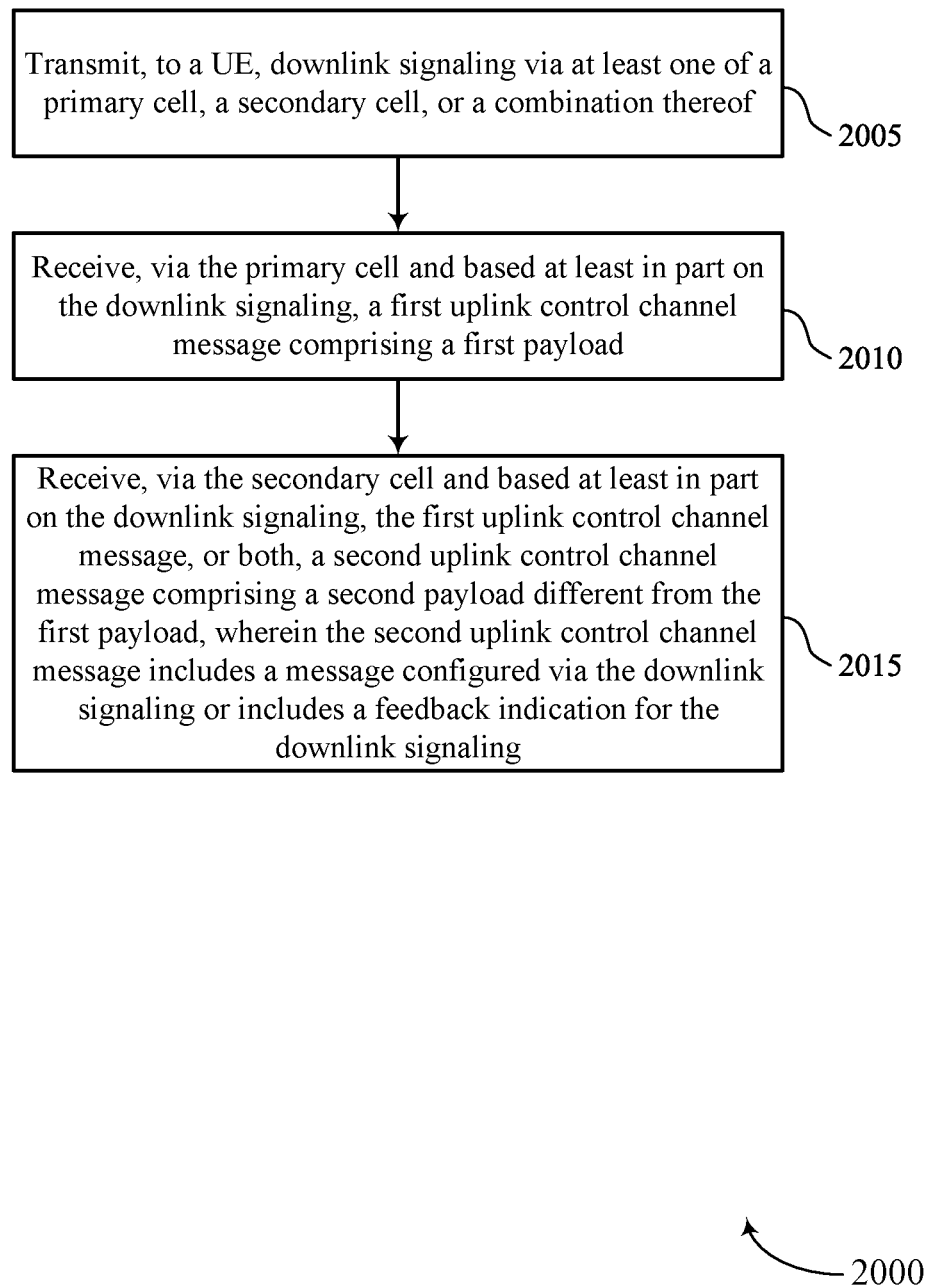

FIG. 20 shows a flowchart illustrating a method 2000 that supports parallel duplicated uplink control channels in uplink carrier aggregation in accordance with aspects of the present disclosure. The operations of the method 2000 may be implemented by a base station or its components as described herein. For example, the operations of the method 2000 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 2005, the method may include transmitting, to a UE, downlink signaling (e.g., downlink transmission) via at least one of a primary cell, a secondary cell, or a combination thereof. The operations of 2005 may be performed in accordance with examples as disclosed herein. In some examples, aspects of the operations of 2005 may be performed by a downlink transmitting manager 1240 as described with reference to FIG. 12.

At 2010, the method may include receiving, via the primary cell and based on the downlink signaling, a first uplink control channel message including a first payload. The operations of 2010 may be performed in accordance with examples as disclosed herein. In some examples, aspects of the operations of 2010 may be performed by an uplink receiving manager 1245 as described with reference to FIG. 12.

At 2015, the method may include receiving, via the secondary cell and based on the downlink transmission, the first uplink control channel message, or both, a second uplink control channel message including a second payload different from the first payload, where the second uplink control channel message includes a message configured via the downlink signaling or includes a feedback indication for the downlink signaling. The operations of 2015 may be performed in accordance with examples as disclosed herein. In some examples, aspects of the operations of 2015 may be performed by an uplink receiving manager 1245 as described with reference to FIG. 12.

The following provides an overview of aspects of the present disclosure:

Aspect 1: A method for wireless communication at a UE, comprising: receiving downlink signaling via at least one of a PCell, an SCell, or a combination thereof; identifying a message configured via the downlink signaling, a feedback indication for the downlink signaling, or both; transmitting, via the PCell and based at least in part on the downlink signaling, a first uplink control channel message comprising a first payload; and transmitting, via the SCell and based at least in part on the downlink signaling, the first uplink control channel message, or both, a second uplink control channel message comprising a second payload different from the first payload, where the second uplink control channel message includes the message configured via the downlink signaling or includes the feedback indication for the downlink signaling.

Aspect 2: The method of aspect 1, further comprising: transmitting the first uplink control channel message via a first set of resources; and transmitting the second uplink control channel message via a second set of resources, wherein the first set of resources and the second set of resources at least partially overlap in a time domain.

Aspect 3: The method of any of aspects 1 through 2, further comprising: transmitting the first uplink control channel message on a first component carrier simultaneously with transmitting the second uplink control channel message on a second component carrier.

Aspect 4: The method of any of aspects 1 through 3, further comprising: receiving first control signaling indicating a first set of resources for the first uplink control channel message, wherein the first uplink control channel message is transmitted within the first set of resources; and receiving second control signaling different from the first control signaling, the second control signaling indicating a second set of resources for the second uplink control channel message, wherein the second uplink control channel message is transmitted within the second set of resources.

Aspect 5: The method of aspect 4, wherein the first control signaling comprises a first RRC message, a first DCI message, or both, and the second control signaling comprises a second RRC message, a second DCI message, or both.

Aspect 6: The method of any of aspects 1 through 5, further comprising: receiving an indication of an uplink control channel resource configuration associated with the PCell and the SCell, wherein the first uplink control channel message and the second uplink control channel message are transmitted in accordance with the uplink control channel resource configuration.

Aspect 7: The method of any of aspects 1 through 6, further comprising: receiving an indication of a first uplink control channel resource configuration associated with the PCell, wherein the first uplink control channel message is transmitted in accordance with the first uplink control channel resource configuration; and receiving an indication of a second uplink control channel resource configuration associated with the PCell, the second uplink control channel resource configuration different from the first uplink control channel resource configuration, wherein the second uplink control channel message is transmitted in accordance with the second uplink control channel resource configuration.

Aspect 8: The method of any of aspects 1 through 7, wherein the PCell is associated with a PUCCH group, the method further comprising: receiving an indication of an activation of the PUCCH group on the SCell, wherein transmitting the second uplink control channel message is based at least in part on the activation.

Aspect 9: The method of aspect 8, further comprising: identifying, based at least in part on the activation of the PUCCH group on the SCell, that the SCell comprises a supplemental PUCCH cell configured for the SCell to receive and the UE to transmit supplemental uplink control channel messages, wherein transmitting the second uplink control channel message is based at least in part on identifying the SCell as a supplemental PUCCH cell.

Aspect 10: The method of any of aspects 1 through 9, further comprising: receiving first control signaling indicating a first slot offset between reception of the downlink signaling and a respective transmission resource for transmitting the first uplink control channel message, wherein the first uplink control channel message is transmitted in accordance with the first slot offset; and receiving second control signaling indicating a second slot offset between reception of the downlink signaling and a respective transmission resource for transmitting the second uplink control channel message, wherein the second uplink control channel message is transmitted in accordance with the second slot offset.

Aspect 11: The method of any of aspects 1 through 10, further comprising: receiving a first TPC command indicative of a first TPC for transmission of the first uplink control channel message, wherein the first uplink control channel message is transmitted in accordance with the first TPC; and receiving a second TPC command indicative of a second TPC different from the first TPC for transmission of the second uplink control channel message, wherein the second uplink control channel message is transmitted in accordance with the second TPC.

Aspect 12: The method of any of aspects 1 through 11, wherein the first payload comprises the feedback indication, and the second payload comprises CSI.

Aspect 13: The method of any of aspects 1 through 12, wherein the first uplink control channel message comprises a first format for uplink control channel messages, and the second uplink control channel message comprises a second format for uplink control channel messages different from the first format.

Aspect 14: The method of any of aspects 1 through 13, wherein the first uplink control channel message comprises a first quantity of symbols, and the second uplink control channel message comprises a second quantity of symbols different from the first quantity of symbols.

Aspect 15: A method for wireless communication at a base station, comprising: transmitting, to a UE, downlink signaling via at least one of a PCell, an SCell, or a combination thereof; receiving, via the PCell and based at least in part on the downlink signaling, a first uplink control channel message comprising a first payload; and receiving, via the SCell and based at least in part on the downlink signaling, the first uplink control channel message, or both, a second uplink control channel message comprising a second payload different from the first payload, where the second uplink control channel message includes a message configured via the downlink signaling or includes a feedback indication for the downlink signaling.

Aspect 16: The method of aspect 15, further comprising: receiving the first uplink control channel message via a first set of resources; and receiving the second uplink control channel message via a second set of resources, wherein the first set of resources and the second set of resources at least partially overlap in a time domain.

Aspect 17: The method of any of aspects 15 through 16, further comprising: receiving the first uplink control channel message on a first component carrier simultaneously with receiving the second uplink control channel message on a second component carrier.

Aspect 18: The method of any of aspects 15 through 17, further comprising: transmitting first control signaling indicating a first set of resources for the first uplink control channel message, wherein the first uplink control channel message is received within the first set of resources; and transmitting second control signaling different from the first control signaling, the second control signaling indicating a second set of resources for the second uplink control channel message, wherein the second uplink control channel message is received within the second set of resources.

Aspect 19: The method of aspect 18, wherein the first control signaling comprises a first RRC message, a first DCI message, or both, and the second control signaling comprises a second RRC message, a second DCI message, or both.

Aspect 20: The method of any of aspects 15 through 19, further comprising: transmitting an indication of an uplink control channel resource configuration associated with the PCell and the SCell, wherein the first uplink control channel message and the second uplink control channel message are received in accordance with the uplink control channel resource configuration.

Aspect 21: The method of any of aspects 15 through 20, further comprising: transmitting an indication of a first uplink control channel resource configuration associated with the PCell, wherein the first uplink control channel message is received in accordance with the first uplink control channel resource configuration; and transmitting an indication of a second uplink control channel resource configuration associated with the PCell, the second uplink control channel resource configuration different from the first uplink control channel resource configuration, wherein the second uplink control channel message is received in accordance with the second uplink control channel resource configuration.

Aspect 22: The method of any of aspects 15 through 21, wherein the PCell is associated with a PUCCH group, the method further comprising: transmitting an indication of an activation of the PUCCH group on the SCell, wherein receiving the second uplink control channel message is based at least in part on the activation.

Aspect 23: The method of aspect 22, further comprising: identifying, based at least in part on the activation of the PUCCH group on the SCell, that the SCell comprises a supplemental PUCCH cell configured for the SCell to receive and the UE to transmit supplemental uplink control channel messages, wherein receiving the second uplink control channel message is based at least in part on identifying the SCell as a supplemental PUCCH cell.

Aspect 24: The method of any of aspects 15 through 23, further comprising: transmitting first control signaling indicating a first slot offset between reception of the downlink signaling and a respective transmission resource for transmitting the first uplink control channel message, wherein the first uplink control channel message is received in accordance with the first slot offset; and transmitting second control signaling indicating a second slot offset between reception of the downlink signaling and a respective transmission resource for transmitting the second uplink control channel message, wherein the second uplink control channel message is received in accordance with the second slot offset.

Aspect 25: The method of any of aspects 15 through 24, further comprising: transmitting a first TPC command indicative of a first TPC for transmission of the first uplink control channel message, wherein the first uplink control channel message is received in accordance with the first TPC; and transmitting a second TPC command indicative of a second TPC different from the first TPC for transmission of the second uplink control channel message, wherein the second uplink control channel message is received in accordance with the second TPC.

Aspect 26: The method of any of aspects 15 through 25, wherein the first payload comprises the feedback indication, and the second payload comprises CSI.

Aspect 27: The method of any of aspects 15 through 26, wherein the first uplink control channel message comprises a first format for uplink control channel messages, and the second uplink control channel message comprises a second format for uplink control channel messages different from the first format.

Aspect 28: The method of any of aspects 15 through 27, wherein the first uplink control channel message comprises a first quantity of symbols, and the second uplink control channel message comprises a second quantity of symbols different from the first quantity of symbols.

Aspect 29: An apparatus for wireless communication at a UE, comprising a processor; memory coupled with the processor; and instructions stored in the memory and executable by the processor to cause the apparatus to perform a method of any of aspects 1 through 14.

Aspect 30: An apparatus for wireless communication at a UE, comprising at least one means for performing a method of any of aspects 1 through 14.

Aspect 31: A non-transitory computer-readable medium storing code for wireless communication at a UE, the code comprising instructions executable by a processor to perform a method of any of aspects 1 through 14.

Aspect 32: An apparatus for wireless communication at a base station, comprising a processor; memory coupled with the processor; and instructions stored in the memory and executable by the processor to cause the apparatus to perform a method of any of aspects 15 through 28.

Aspect 33: An apparatus for wireless communication at a base station, comprising at least one means for performing a method of any of aspects 15 through 28.

Aspect 34: A non-transitory computer-readable medium storing code for wireless communication at a base station, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving downlink signaling via at least one of a primary cell, a secondary cell, or a combination thereof;
   identifying a message configured via the downlink signaling, a feedback indication for the downlink signaling, or both;
   transmitting, via the primary cell and based at least, in part on the downlink signaling, a first uplink control channel message comprising a first payload; and
   transmitting, via the secondary cell and based at least in part on the downlink signaling, the first uplink control channel message, or both, a second uplink control channel message comprising a second payload different from the first payload, wherein the second uplink control channel message comprises the message configured via the downlink signaling or includes the feedback indication for the downlink signaling,
   wherein the first uplink control channel message comprises a first quantity of symbols, and wherein the second uplink control channel message comprises a second quantity of symbols different from the first quantity of symbols.

2. The method of claim 1, further comprising:
   transmitting the first uplink control channel message via a first set of resources: and
   transmitting the second uplink control channel message via a second set of resources, wherein the first set of resources and the second set of resources at least partially overlap in a time domain.

3. The method of claim 1, further comprising:
   transmitting the first uplink control channel message on a first component carrier simultaneously with transmitting the second uplink control channel message on a second component carrier.

4. The method of claim 1, further comprising:
   receiving first control signaling indicating a first set of resources for the first uplink control channel message, wherein the first uplink control channel message is transmitted within the first set of resources; and
   receiving second control signaling different from the first control signaling, the second control signaling indicating a second set of resources for the second uplink control channel message, wherein the second uplink control channel message is transmitted within the second set of resources.

5. The method of claim 4, wherein the first control signaling comprises a first radio resource control message, a first downlink control information message, or both, and wherein the second control signaling comprises a second radio resource control message, a second downlink control information message, or both.

6. The method of claim 1, further comprising:
   receiving an indication of an uplink control channel resource configuration associated with the primary cell and the secondary cell, wherein the first uplink control channel message and the second uplink control channel message are transmitted in accordance with the uplink control channel resource configuration.

7. The method of claim I, further comprising:
   receiving an indication of a first uplink control channel resource configuration associated with the primary cell, wherein the first uplink control channel message is transmitted in accordance with the first uplink control channel resource configuration; and
   receiving an indication of a second uplink control channel resource configuration associated with the primary cell, the second uplink control channel resource configuration different from the first uplink control channel resource configuration, wherein the second uplink control channel message is transmitted in accordance with the second uplink control channel resource configuration.

8. The method of claim 1, wherein the primary cell is associated with a physical uplink control channel group, the method further comprising:
   receiving an indication of an activation of the physical uplink control channel group on the secondary cell, wherein transmitting the second uplink control channel message is based at least in part on the activation.

9. The method of claim 8, further comprising:
   identifying, based at least in part on the activation of the physical uplink control channel group on the secondary cell, that the secondary cell comprises a supplemental physical uplink control channel cell configured for the secondary cell to receive and the UE to transmit supplemental uplink control channel messages, wherein transmitting the second uplink, control channel message is based at least in part on identifying the secondary cell as a supplemental physical uplink control channel cell.

10. The method of claim 1, further comprising:
    receiving first control signaling indicating a first slot offset between reception of the downlink signaling and a respective transmission resource for transmitting the first uplink control channel message, wherein the first uplink control channel message is transmitted in accordance with the first slot offset; and
    receiving second control signaling indicating a second slot offset between reception of the downlink signaling and a respective transmission resource for transmitting the second uplink control channel message, wherein the second uplink control channel message is transmitted in accordance with the second slot offset.

11. The method of claim 1, further comprising:
receiving a first transmit power control command indicative of a first transmit power control for transmission of the first uplink control channel message, wherein the first uplink control channel message is transmitted in accordance with the first transmit power control: and
receiving a second transmit power control command indicative of a second transmit power control different from the first transmit power control for transmission of the second uplink control channel message, wherein the second uplink control channel message is transmitted in accordance with the second transmit power control.

12. The method of claim 1, wherein the first payload comprises the feedback indication, and wherein the second payload comprises channel state information.

13. The method of claim 1 wherein the first uplink control channel message comprises a first format for uplink control channel messages, and wherein the second uplink control channel message comprises a second format for uplink control channel messages different from the first format.

14. A method for wireless communication at a base station, comprising:
transmitting, to a user equipment (LIE), downlink signaling via at least one of a primary cell, a secondary cell, or a combination thereof
receiving, via the primary cell and based at least in part on the downlink signaling, a first uplink control channel message comprising a first payload; and
receiving, via the secondary cell and based at least in part on the downlink signaling, the first uplink control channel message, or both, a second uplink control channel message comprising a second payload different from the first payload, wherein the second uplink control channel message comprises a message configured via the downlink signaling or includes a feedback indication for the downlink signaling,
wherein the first uplink control channel message comprises a first quantity of symbols, and wherein the second uplink control channel message comprises a second quantity of symbols different from the first quantity of symbols.

15. The method of claim 14, further comprising:
receiving the first uplink control channel message via a first set of resources; and
receiving the second uplink control channel message via a second set of resources, wherein the first set of resources and the second set of resources at least partially overlap in a time domain.

16. The method of claim 14, further comprising:
receiving the first uplink control channel message on a first component carrier simultaneously with receiving the second uplink control channel message on a second component carrier.

17. The method of claim 14, further comprising:
transmitting first control signaling indicating a first set of resources for the first uplink control channel message, wherein the first uplink control channel message is received within the first set of resources; and
transmitting second control signaling different from the first control signaling, the second control signaling indicating a second set of resources for the second uplink control channel message, wherein the second uplink control channel message is received within the second set of resources.

18. The method of claim 17, wherein the first control signaling comprises a first radio resource control message, a first downlink control information message, or both, and wherein the second control signaling comprises a second radio resource control message, a second downlink control information message, or both.

19. The method of claim 14, further comprising:
transmitting an indication of an uplink control channel resource configuration associated with the primary cell and the secondary cell, wherein the first uplink control channel message and the second uplink control channel message are received in accordance with the uplink control channel resource configuration.

20. The method of claim 14, further comprising:
transmitting an indication of a first uplink control channel resource configuration associated with the primary cell, wherein the first uplink control channel message is received in accordance with the first uplink control channel resource configuration; and
transmitting an indication of a second uplink control channel resource configuration associated with the primary cell, the second uplink control channel resource configuration different from the first uplink control channel resource configuration, wherein the second uplink control channel message is received in accordance with the second uplink control channel resource configuration.

21. The method of claim 14, wherein the primary cell is associated with a physical uplink control channel group, the method further comprising:
transmitting an indication of an activation, of the physical uplink control channel group on the secondary cell, wherein receiving the second uplink control channel message is based at least in part on the activation.

22. The method of claim 21, further comprising:
identifying, based at least in part on the activation of the physical uplink control channel group on the secondary cell, that the secondary cell comprises a supplemental physical uplink control channel cell configured for the secondary cell to receive and the UE to transmit supplemental uplink control channel messages, wherein receiving the second uplink control channel message is based at least in part on identifying the secondary cell as a supplemental physical uplink control channel cell.

23. The method of claim 14, further comprising:
transmitting first control signaling indicating a first slot offset between reception of the downlink signaling and a respective transmission resource for transmitting the first uplink control channel message, wherein the first uplink control channel message is received in accordance with the first slot offset; and
transmitting second control signaling indicating a second slot offset between reception of the downlink signaling and a respective transmission resource for transmitting the second uplink control channel message, wherein the second uplink control channel message is received in accordance with the second slot offset.

24. The method of claim 14, further comprising:
transmitting a first transmit power control command indicative of a first transmit power control for transmission of the first uplink control channel message, wherein the first uplink control channel message is received in accordance with the first transmit power control; and
transmitting a second transmit power control command indicative of a second transmit power control different from the first transmit power control for transmission of the second uplink control channel message, wherein the second uplink control channel message is received in accordance with the second transmit power control.

25. The method of claim 14, wherein the first payload comprises the feedback indication, and wherein the second payload comprises channel state information.

26. The method of claim 14, wherein the first uplink control channel message comprises a first format for uplink control channel messages, and wherein the second uplink control channel message comprises a second format for uplink control channel messages different from the first format.

27. An apparatus, comprising:
a processor; and
memory, coupled with the processor, for storing instructions executable by the processor to:
receive downlink signaling via at least one of a primary cell, a secondary cell, or a combination thereof;
identify a message configured via the downlink signaling, a feedback indication for the downlink signaling, or both;
transmit, via the primary cell and based at least in part on the downlink signaling, a first uplink control channel message comprising a first payload; and
transmit, via the secondary cell and based at least in part on the downlink signaling, the first uplink control channel message, or both, a second uplink control channel message comprising a second payload different from the first payload, wherein the second uplink control channel message comprises the message configured via the downlink signaling or includes the feedback indication for the downlink signaling,
wherein the first uplink control channel message comprises a first quantity of symbols, and wherein the second uplink control channel message comprises a second quantity of symbols different from the first quantity of symbols.

28. An apparatus, comprising:
a processor; and
memory, coupled with the processor, for storing instructions executable by the processor to
transmit, to a user equipment (UE), downlink signaling via at least one of a primary cell, a secondary cell, or a combination thereof;
receive, via the primary cell and based at least in part on the downlink signaling, a first uplink control channel message comprising a first payload; and
receive, via the secondary cell and based at least in part on the downlink signaling, the first uplink control channel message, or both, a second uplink control channel message comprising a second payload different from the first payload, wherein the second uplink control channel message comprises a message configured via the downlink signaling or includes a feedback indication for the downlink signaling,
wherein the first uplink control channel message comprises a first quantity of symbols, and wherein the second uplink control channel message comprises a second quantity of symbols different from the first quantity of symbols.

* * * * *